United States Patent
Altounian et al.

(10) Patent No.: US 8,005,874 B2
(45) Date of Patent: *Aug. 23, 2011

(54) DATA TAG CREATION FROM A PHYSICAL ITEM DATA RECORD TO BE ATTACHED TO A PHYSICAL ITEM

(75) Inventors: David Altounian, Austin, TX (US); Charles Zeller, Austin, TX (US); Sara Fox, Austin, TX (US)

(73) Assignee: iTaggit, Inc., Austin, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 12/426,914

(22) Filed: Apr. 20, 2009

(65) Prior Publication Data

US 2009/0307013 A1 Dec. 10, 2009

Related U.S. Application Data

(63) Continuation of application No. 11/559,390, filed on Nov. 13, 2006, now Pat. No. 7,523,132, which is a continuation-in-part of application No. 11/521,891, filed on Sep. 15, 2006, and a continuation-in-part of application No. 11/486,709, filed on Jul. 14, 2006.

(60) Provisional application No. 60/771,135, filed on Feb. 6, 2006, provisional application No. 60/743,733, filed on Mar. 24, 2006, provisional application No. 60/743,735, filed on Mar. 24, 2006, provisional application No. 60/743,734, filed on Mar. 24, 2006, provisional application No. 60/743,737, filed on Mar. 24, 2006, provisional application No. 60/743,736, filed on Mar. 24, 2006.

(51) Int. Cl.
*G06F 7/00* (2006.01)
*G06F 17/30* (2006.01)
(52) U.S. Cl. ........................................ 707/803
(58) Field of Classification Search .................. None
See application file for complete search history.

(56) References Cited

U.S. PATENT DOCUMENTS

2005/0246661 A1* 11/2005 Klein ........................... 715/811
2007/0187266 A1* 8/2007 Porter et al. ................ 206/232
2007/0252696 A1* 11/2007 Belisle et al. .............. 340/572.1

* cited by examiner

Primary Examiner — Uyen T. Le
(74) Attorney, Agent, or Firm — Garlick Harrison & Markison; Kevin L. Smith

(57) ABSTRACT

A item data management server having the capability to create a data tag from a physical item data record, where the physical item data record is based upon a physical item in the control of a user. The data tag creation facilitates the identification, maintenance and upkeep of the inventory of physical items, and also provides a feature for providing information relating to the physical items to the user/owner as well as to third-party service providers, such as insurers, and to governmental authorities, such as in the event of theft, to aid in the recovery of the physical items.

12 Claims, 29 Drawing Sheets communication system 10 add physical item GUI 200 rapid item import GUI 230 physical item data record 240 web page 168 navigation bar
202

Gallery   Forums   Blogs   Community

My Collections  collection identifier field 282   collection owner field 284   collection type/ community field 286

| Name: | Owner: | Type: | Items | Valuation |
|---|---|---|---|---|
| Global Collection | iTaggit | | | |
| COLLECTION Z | [me] | Shared – Community A | 777 | $xxx.xx |
| COLLECTION A | user ID | Shared – Community B | 2 | $yyy.yy |
| COLLECTION B | [me] | Private | Private | $zzz.zz |
| COLLECTION C | user ID | Shared – Community C | 55 | $nnn.nn |
| COLLECTION D | user ID | Shared – Community D | 1457 | $ppp.pp |
| COLLECTION E | [me] | Private | Private | $ddd.dd | add new collection   create collection query 292   items field 290   collection valuation field 288

FIG. 9
collection summary
web page 280 item view web page 320 edit/create collection GUI 360 collection reference
data structure 400

| Community_X | | |
|---|---|---|
| creator | joecollector3 | permissions |
| user_00 | hikepuppy | review / alter |
| user_01 | fredf | review / alter |
| user_02 | barneyr | review / alter |
| user_03 | wilmaf | review / ~~alter~~ |
| user_04 | bettyr | review / ~~alter~~ |
| user_05 | dinof | review / ~~alter~~ |

- community identifier 422
- creator identifier 423
- subscriber fields 424
- subscriber identification fields 426
- subscriber name fields 428
- permission fields 430

FIG. 13
community reference data structure 420 collection web page 440 category GUI 480 method for operating a
data management server method for operating a
data management server web page 600 shopping query 620 data tag creation query 660 key 242 →  } first data size threshold one-dimensional
(1D) barcode 700 key 242 plus
"x" personalized data
tag attributes 662 →  } second data size threshold two-dimensional (2D)
barcode 702 key 242 plus
"y" personalized data
tag attributes 662 →  } third data size threshold radio frequency ID
(RFID) data tag 704 insurance server fields 690
for physical item data record 240

DATA TAG CREATION FROM A PHYSICAL ITEM DATA RECORD TO BE ATTACHED TO A PHYSICAL ITEM

CROSS-REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S application Ser. No. 11/559,390, entitled "Data Tag Creation from a Physical Item Data Record to be attached to a Physical Item," filed Nov. 13, 2006, now issued as U.S. Pat. No. 7,523,132, on Apr. 21, 2009, which claims priority pursuant to 35 U.S.C. §120, as a continuation-in-part (CIP), to the following U.S. Utility Patent Applications which are hereby incorporated herein by reference in their entirety and made part of the present U.S. Utility Patent Application for all purposes a. U.S. application Ser. No. 11/521,891, entitled "Processing and Determining Valuation over a Data Network for a Physical Item in the Control of a User," filed Sep. 15, 2006, pending, b. U.S. application Ser. No. 11/486,709, filed Jul. 14, 2006, for "Item Data Management over a Data Network for Physical Items in the Control of a User," which claim priority pursuant to 35 U.S.C. §119(e) to the following U.S. Provisional Patent Applications which are hereby incorporated herein by reference in their entirety and made part of the present U.S. Utility Patent Application for all purposes:

i. U.S. Provisional Application Ser. No. 60/771,135, entitled "Item Tagging System," filed Feb. 6, 2006, expired;

ii. U.S. Provisional Application Ser. No. 60/743,733, entitled "A System and Method for Processing and Determining Value of a Surplus Item," filed Mar. 24, 2006, expired;

iii. U.S. Provisional Application Ser. No. 60/743,735, entitled "System and Method for Building Communities using Item-Centric Attributes and Descriptors," filed Mar. 24, 2006, expired;

iv. U.S. Provisional Application Ser. No. 60/743,734, entitled "A System and Method for a Rapid Item Collection System," filed Mar. 24, 2006, expired;

v. U.S. Provisional Application Ser. No. 60/743,737, entitled "A System and Method for Transferring Information and Records on an Item via a Data Structure," filed Mar. 24, 2006, expired; and vi. U.S. Provisional Application Ser. No. 60/743,736, entitled "A System and Method for Managing and Tracking Information Regarding an Aspect of an Item." filed Mar. 24, 2006, expired.

BACKGROUND

1. Technical Field

The present invention relates generally to server systems accessible by user terminals, and more particularly to server systems providing physical item database services to users over a network.

2. Related Art

Historically, collectors, business owners, and others have kept written listings and/or ledgers that identify their physical items, whether they are collectibles, household possessions, business equipment, product inventory, or other physical items. The written listings/ledgers typically included additional information regarding the physical items, for example, quantity, value, physical characteristics, model number, serial number, et cetera. Generation of these listings/ledgers was difficult. Further, when the status of the physical items represented in the written listing/ledger changed, it was very difficult to alter the written listings/ledgers to represent the change in status.

As technology advanced, computer based inventory programs replaced written listings/ledgers. While the computer based programs moved the record keeping from a hand-written to an electronic format, the burdensome data entry and organizational requirements for interacting with the computer based inventory programs remained with the user. Data entry for dissimilar physical items still necessitated repeating the input process multiple times, even when using a computer-based program.

Often, collectors, business owners, and others required information relating to their physical items. In obtaining this information, these persons accessed the Internet, particularly looking to ecommerce sites for such information. Ecommerce sites, however, had generated information that was limited to specific search terms selected by a user, and not based upon the items in the user's control. That is, information returned in a search tool is limited to the capability of the user to generate a sufficient search string—that is, to have the requisite "knowledge to know what they do not know." As a result, time and energy was needlessly expended refining a search that in the end may not render a suitable result for the user.

Once the inventory database was established, however, the number of physical items in the inventory increased, as did the burden to maintain the itemized inventory, location, and identification of the physical items. As the inventory lapsed into disuse due to the effort to maintain the database, the ability to recreate the inventory became very difficult when faced with filing claims with governmental authorities and/or insurers upon the loss or destruction of items. Accordingly, a need exists for reducing the maintenance burden of an inventory of physical items, and to simplify the process to provide the physical items and/or updated inventory listings to third party service providers.

BRIEF DESCRIPTION OF THE DRAWINGS

FIG. 9 is an illustration of a collection summary web page created by the item data management server according to an embodiment of the present invention;

FIG. 13 is an illustration of a community reference data structure according to an embodiment of the invention;

DETAILED DESCRIPTION OF THE DRAWINGS

Figure 1:
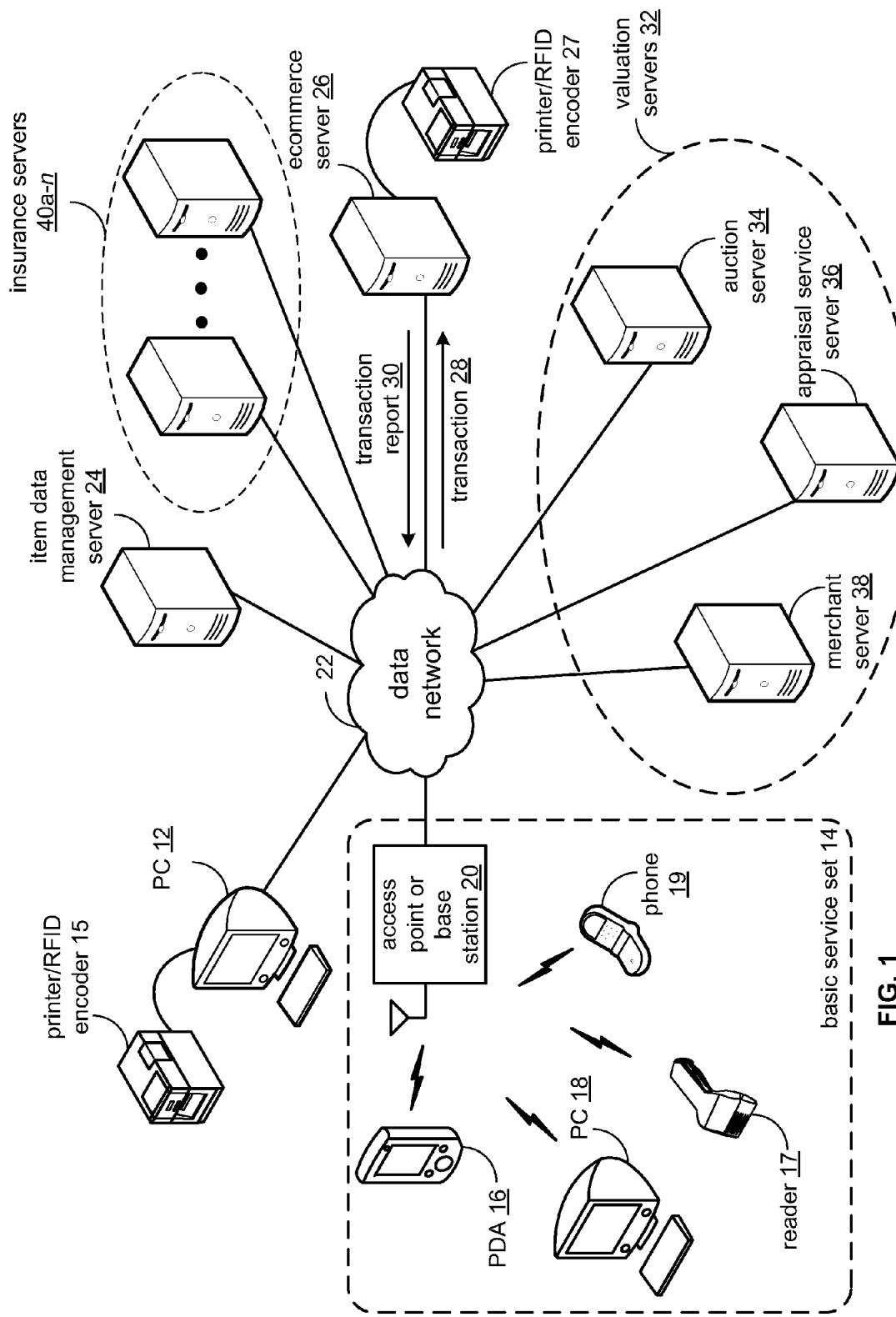
FIG. 1 is a functional block diagram illustrating a communication system with an item data management server according to an embodiment of the invention.

FIG. 1 is a functional block diagram illustrating a communication system 10 that includes circuit devices and network elements and operation thereof with an item data management server according to one embodiment of the invention. More specifically, the communication system 10 includes a network service area 14, or basic service sets ("BSS"), and a plurality of communication devices coupled via a data network 22. The network service area 14 is coupled to the data network 22 through a base station or access point 20. The wireless communications devices of the network service area 14 may include a personal digital assistant ("PDA") 16, personal computers 18, which may be a desktop computer or a laptop computer, and/or a cellular telephone 19. The wireless communications devices may also include a barcode and/or RFID reader 17 that includes a user interface having a display screen and/or keypad for communicating in the basic service set 14, as well as providing input/output functionality via the personal computer 18. Further, the reader 17 has the capability to convert the digital data of a physical item data tag into a human readable form, allowing quick assessment of the attributes of an item.

A user terminal is provided via a PC 12 that receives web pages presented by the item data management server 24 for display to a user. The user further provides response queries from the item data management server 24 that are presented in web page format or other graphic user interface formats. A printer/RFID encoder 15 couples, through a wired or wireless network, to the PC 12 to create tags, which are attached to a physical item in the control of a user. The tags may be in a variety of forms, such as 1-dimensional bar code tags, 2-dimensional bar code tags, and/or radio frequency ID format tags.

The base station or access point 14 has an associated antenna or antenna array to communicate with the wireless communication devices in its service area. Typically, the wireless communication devices 16, 17, 18, and 19 register with the particular base station or access point 14 to receive services from the communication system 10.

Typically, base stations are used for cellular telephone systems and like-type systems, while access points are used for in-home or in-building wireless networks. Regardless of the particular type of communication system, each wireless communication device includes a built-in radio and/or is coupled to a radio. For packet or data transmission, cellular communication systems provide packet-based communication and interaction with data networks in accordance with applicable standards specifications (for example, 3GPP2, 1xRTT, et cetera.).

The communication devices serve as a user terminal, and are communicatively coupled to the item data management server 24 via the data network 22. The item data management server 24 provides the capturing, storing, organizing and presenting of information regarding a plurality of physical items in the control of a user. The details of the item data management server 24 will be described in greater detail with reference to FIGS. 2 through 30.

The data network 22 may be a single data network, a plurality of data networks that are coupled to communicatively couple a user terminal to the item data management server 24. The data network 22 may be the Internet, a X.25 network, or private networks such as a local area network (LAN) or a combination thereof.

Other servers of the communications system 10 are accessible by the item data management server 24 in support of the functionality or services of the item data management server 24. For example, the network system 10 includes an ecommerce server 26, valuation servers 32, and a plurality of insurance servers 40a-x. The valuation servers 32 include an auction server 34, and appraisal service server 36, and a merchant server 38. Other forms of valuation servers 32 may be included, such as item brokerage servers, consignment servers, et cetera.

As one of ordinary skill in the art may appreciate, the server functions, whether pertaining to an item data management server 24, an ecommerce server 26, or the valuation servers 32, may be carried out through individual servers and/or a combination of servers coupled across a network (such as a local area network, a wireless local area network, a wide area network, et cetera), and that the servers may be shown as single function devices for the purpose of an illustrative example. Further, valuation services may be provided locally via assigned or locally computed item valuations.

The ecommerce server 26 facilitates commercial transactions over the data network 22. An ecommerce service provider enables and services secure communications (such as via a secure socket layer (SSL)), provides credit card processing functionality, provides inventory functionality, provides sale facilitation between two parties (for example, as through an auction transaction), et cetera. In operation, when a user engages in a transaction via the item data management sever 24, the ecommerce server 26 receives a transaction 28, processes the transaction and returns a transaction report 30. For example, the ecommerce server 26 may provide tag printing services through a coupled or networked printer/RFID encoder 27. In this manner, the item data management server 24 creates tags at the situs of the user through the printer/RFID encoder 15 and/or as a remote service through the eCommerce server 26 via a printer/RFID encoder 27. The printer/RFID encoder 27, and 15, may be of different commercial grades to accommodate different use demands. For example, the printer/RFID encoder 27 may be a commercial-grade quality encoder for producing larger quantities of tags, while the printer/RFID encoder 15 may be a personal use quality encoder for producing quantities sufficient for an individual user.

The valuation servers 32 provide information and data for the item data management server 24 for valuation estimates and/or appraisals of physical items in the control of a user, as reflected through physical item data records stored on the item data management server 24. The item data management server 24 accesses the valuation servers, such as a merchant server 38 and/or an auction server 34, to retrieve data relating to auction values and commercial sale values of the physical item. Also, the item data management server 24 accesses values stored in the database(s) for value determination of a physical item. With these values, the item data management server 24 can generate a valuation estimate through a sum average valuation or other suitable valuation method. These values, or item prices, may be presented to the user as a single price/value, as well as a value range based upon standard statistical methods such as Bell curves, et cetera. Paid appraisal services are also accessible via an appraisal service server 36, which provide appraisal-value documentation, with electronic certificates, for an item based upon the attributes for a physical item.

In operation, the item data management server 24 engages in a plurality of searches and server accesses to arrive at a sum-average or best-fit average valuation. For example, item data management server 24 may determine the valuation of the physical item, or items, by accessing various on-line sites including, such as auction sites, various reference book and/or magazine sites to retrieve data for making a valuation. For example, if the item is an automobile, the item data management server 24 may survey sites such as Kelly's Blue Book (bbk.com), Edmunds.com, Autobytel.com, Cars.com and/or CarFax.com and solicit valuations based on the physical item attributes (such as vehicle identification number, mileage, accessories, make, model, year, repair history, et cetera). When multiple valuation references are returned to the item data management server 24, the sum-average valuation or valuation may also be based on a normal, or Gaussian, distribution curve.

Furthermore, general research can be conducted over the network 22 through the item data management server 24 based upon the attributes responses stored for each of the physical items of the database. This has the advantage of having the information readily available for subsequent research, with the attributes for each of the physical items to more particularly achieve specific results pertaining to a physical item.

Figure 2:
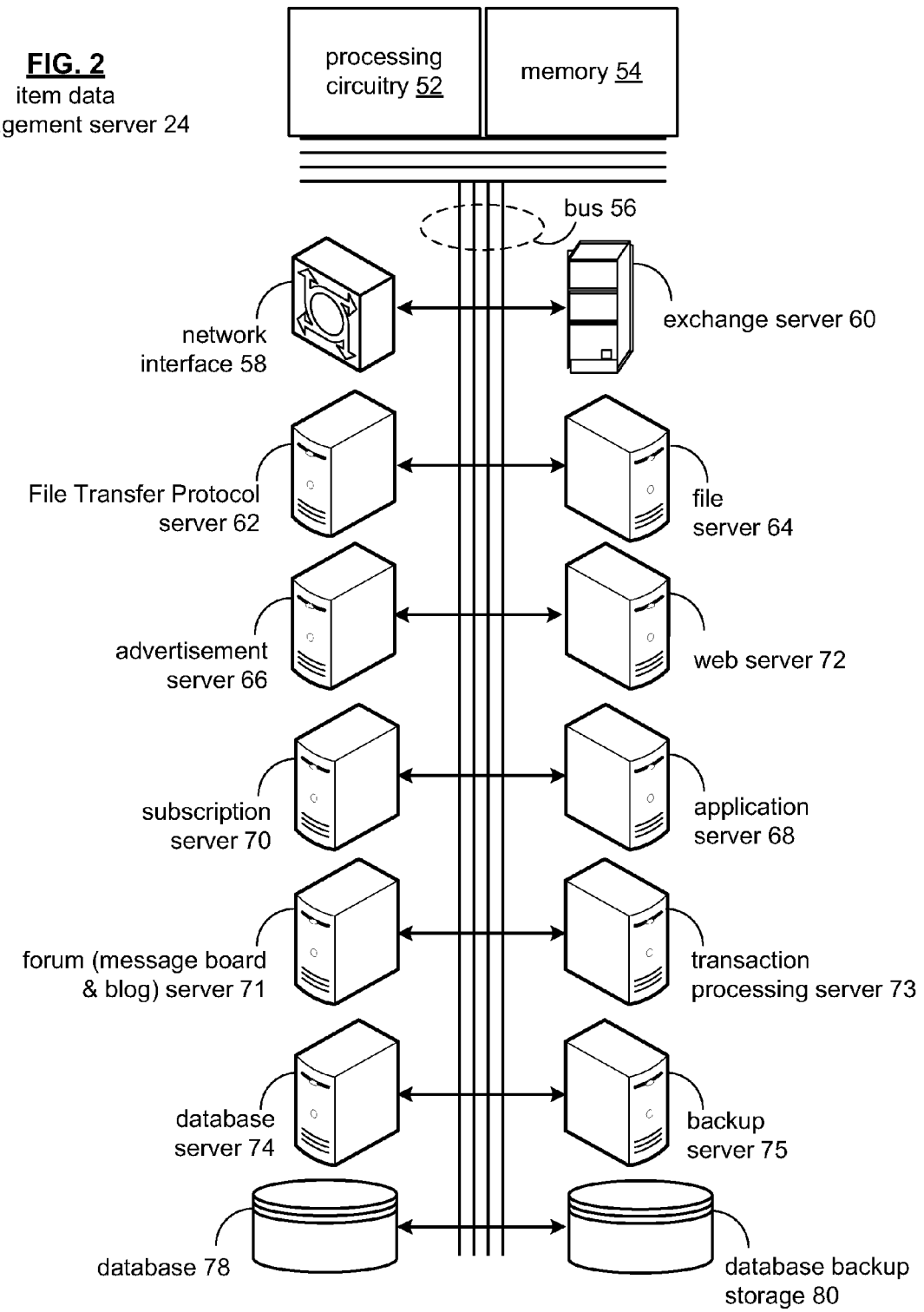
FIG. 2 is a block diagram that provides a system level overview of the item data management server according to an embodiment of the invention.

FIG. 2 is a block diagram that provides a system level overview of the item data management server 24. The item data management server can be a self contained unit containing the functionality to capture, store, organize and present information regarding a plurality of physical items in the control of a user, or embodied as a distributed system the includes multiple application-specific servers and network components.

The item data management server 24 includes processing circuitry 52 and memory 54 that stores operational instructions that cause the processing circuitry 52 to carry out the methods and/or processes of the present invention. The processing circuitry 52 operates pursuant to an operating system such as IBM OS/2, Linux, UNIX, Microsoft Windows, Apple OS X, SUN OS, and other commercially available operating systems that provides functionality for the services provided by the present invention. The operating system or systems may reside at a central location or operate as a distributed resource.

The memory 54 stores software programs or modules that cause the processing circuitry 52 to perform tasks such as, but not limited to, facilitating client requests, system maintenance, security, data storage, data backup, data mining and document/report generation. The provided functionality may be embodied directly in hardware, in a software module executed by a processor or in any combination of thereof. Further, software operations may be executed, in part or wholly, by one or more servers or a client's system, via hardware, software module or any combination thereof.

The memory 54 may be provided as RAM memory, flash memory, ROM memory, EPROM memory, EEPROM memory, registers, hard disk, a removable disk, a CD-ROM, DVD, optical disk, or any other form of suitable storage medium. The memory may be a self-standing device or units coupled to the processor such that the processor can read information from, and write information to, the memory. In the alternative, the memory may be integral to the processor.

The item management server 24 includes a network interface 58, an exchange server 60, a File Transfer Protocol server 62, a file server 64, an advertisement server 66, an application server 68, a subscription server 70, a web server 72, a forum (message board and blog) server 71, a transaction processing server 73, a database server 74, a backup server 75, a database 78, and a database backup storage 80. Each of the servers or databases may be duplicated or mirrored to provide system redundancy and promote maintenance and the integrity of the data by being hot swappable. Also, the servers as shown provide individual functions; however, multiple server functions may be consolidated onto a single server platform that include sufficient processing and storage resources, a single server function may be provided on a distributed server platform that includes sufficient processing and storage resources. The processing circuitry is in communication with these components via a bus 56. In the instance of a distributed system, a local area network provides the bus 56.

The network interface 58 supports data transmission with the data network 22. The exchange server 60 provides messaging services such as an email client and groupware applications (for example, shared calendars). The applications of the exchange server 60 may be accessed via a POP3 (Post Office Protocol) and IMAP4 (Internet Messaging Access Protocol) through clients such as Mozilla Thunderbird and Lotus Notes for email access to email clients, such as subscribers to the item data management server 24. In operation, the exchange server 60 provides customer interaction and customer relationship management functions with users of the item data management server 24.

The FTP (File Transfer Protocol) server 62, and file server 64 provide document access functionality. The FTP server 62 and file server 64 stores files (such as documents, images, media) and makes them available over the data network 22 and the ability to transfer files between two internet sites. The subscription server 70 provides online registration and subscription management service for physical item capture, storage, organization, and information presentation.

The application server 68 delivers content over the data network 22 by interpreting web site traffic and constructing web pages based on a dynamic content repository, such as that provided via a physical item data record relating to the physical item in the control of a user. The content is personalized based on site visitor information, such as the content viewed, the content of the physical item data record, past transaction history, or user defined preferences.

The advertisement server 66 stores, retrieves, and manages advertisements for presentation to a user in the control of a physical item. In operation, the advertisement server 66 manages advertisement services for third-party advertisers affiliated with the item data management server 24, manages locally generated advertisements, and generates statistics regarding advertisement effectiveness (such as access clicks by users, page access, et cetera). Further, the advertisement server 66 can deliver advertisements based upon attributes of the physical items in the control of the user, as well as based upon user attributes such as keyword, IP address, domain, weekday, hour of day, language, browser, operating system, et cetera.

The transaction processing server 73 processes financial transactions (such as credit card transactions, banking transactions, PayPal transactions, bartering transactions, et cetera) of the user with other subscribers or third-party entities relating to a physical item in the control of the user. In operation, when the user is entering into a transaction, they are linked to a secure payment information query (where the customer is given visual clues of the forms Secure Socket Layer (SSL) encryption).

When the user submits payment information, the transaction processing server 73 processes the transaction and gives the user immediate transaction status—approval, decline or other status indication. Further, if the transaction processing server 73 approves the transaction, the exchange server 60 sends an e-mail message containing the user's contact information (such as the mailing information) and an transaction summary both to the user and the other party, which may another subscriber to the item data management server 24 or a merchant. The transaction processing server 73 may provide other services, such as mailing labels, when the user has conveyed a physical item in their control to another party.

The forum server 71 provides message board and blog services to the users of the item data management server 24. Examples of the services may be frequently asked question (FAQ) management for the user community, and to support communities created by the users to allow the sharing information either openly or in a moderated manner, such as though a message board or blog (that is, a web log).

The web server 72 stores HyperText Markup Language ("HTML") or EXtensible Markup ("XML") documents that can be retrieved via a Web browser at the user terminal.

The database server 74 executes database software for access to data stored in the database 78 that enables a user and/or a database administrator to enter, organize, and select data in a database. The backup server 75 and database backup storage 80 provides data redundancy and backup services to physical item data records. Examples of a database management system ("DBMS") software, or database client programs, are Microsoft Access, MySQL, et cetera. Databases are organized by fields, records and files. A field is a single piece of information; a record is one complete set of fields; and a file is a collection of records. An alternative concept in database design is known as Hypertext. In a Hypertext database, any object, whether it be a piece of text, a picture or a film/video, can be linked to other objects and is useful for organizing large amounts of disparate information.

The database on the database server 78 and/or the backup server 75 may be of a hierarchical, relational or distributed database structure. In a distributed database structure, two or more data files are located at different computers coupled across a computer network. Because the database is distributed, different users can access the database contents without interfering with one another. A DBMS, however, periodically synchronizes the scattered databases to make sure that all users have consistent data.

Figure 3:
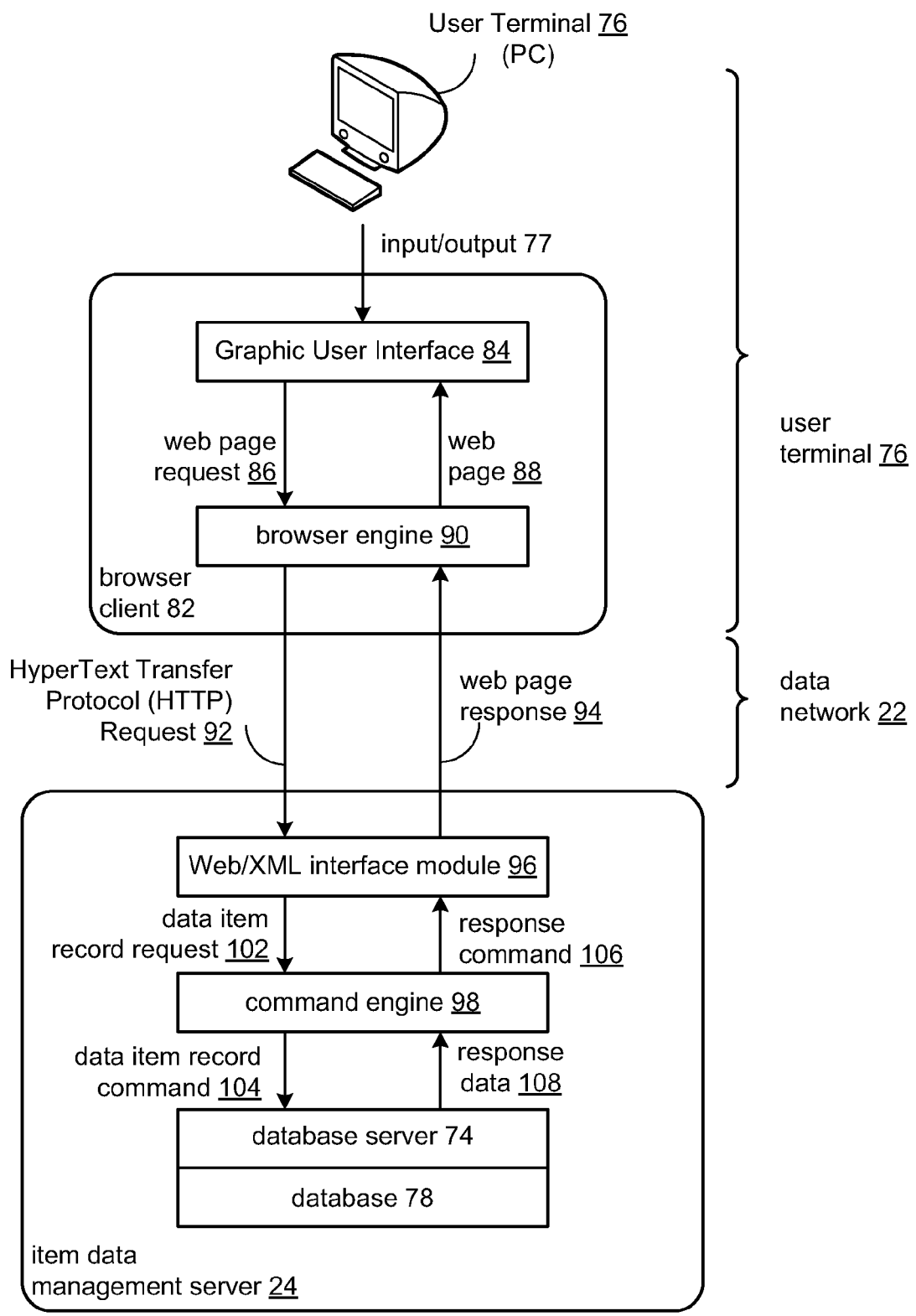
FIG. 3 is a block diagram of a system level operation illustrating a functional or client level operation of a user terminal with the item data management server across a data network according to an embodiment of the invention.

FIG. 3 is a block diagram of a system level operation illustrating a functional or client level operation of the user terminal 76 with the item data management server 24 across a data network 22.

The user terminal 76 (personal computer) includes a browser client 82 having a graphic user interface ("GUI") 84 and a browser engine 90 that may be an Asynchronous JavaScript and XML ("AJAX") engine, a HyperText Transfer Protocol ("HTTP") engine, et cetera. The browser client 82 may be a provided by a browser application such as Netscape, Firefox, Opera, Safari and/or Internet Explorer. For secure transmission, the selected browser client employs SSL protocol or other such secure transmission protocol.

The item data management server 24 includes a HyperText Transfer Protocol/eXtensible Markup Language (HTTP/XML) interface module 96, a command engine 98, and database system components 74 and 78. In general, the browser client 82 accesses the item data management server 24, which stores or creates resources such as HyperText Markup Language ("HTML") files and images. Between the user terminal 76 and the item data management server 24 is the data network 22, which as noted earlier, may include several intermediaries, such as proxies, gateways, tunnels, et cetera.

The user terminal 76 receives input and provides output via input/output 77 to the browser client 82 through the graphic user interface ("GUI") 84. The browser engine 90 receives a web page request 86 from the GUI 84. An AJAX engine implements a process for using a number of existing technologies together, including the following: HTML or XHTML, Cascading Style Sheets, JavaScript, the Document Object Model, XML, XSLT, and the XMLHttpRequest object for incrementally updating the web page presented and displayed through the GUI 84. The AJAX engine operates to increase web page "responsiveness" by exchanging small amounts of data with the item data management server 24 behind the scenes, so that an entire web page does not have to be reloaded each time the user makes a change, as well as increase interactivity, speed, and usability of a web page.

The browser engine 90 sends a HTTP request 92 to the item data management server 24, where HTTP is a request/response protocol used for providing a convey the request across the data network 22. The browser engine 90 uses the HTTP for transmitting HyperText Markup Language (HTML) pages across data networks (such as the Internet). HTTP is a request/response protocol for transmitting Hyper-Text Markup Language ("HTML") web pages across data networks 22, such as the Internet, between browser clients and servers. HTTP is defined under IETF Request for Comment ("RFC") 2616.

The Web/XML interface module 96 receives the HTTP request 102 and processes therefrom the data item record request 102. The data item record request 102 is based upon the input of the user via the user terminal 76. Examples of a data item record request include a query to the item data management server 24, a query response, data input regarding a physical item, a command for additional information, et cetera.

The command engine 98 receives the data item record request 102, and with the data item record command 104, accesses the database systems 100 and retrieves response data 108. The command engine 98 provides a response command to the Web/XML interface module 96. The Web/XML interface module sends a web page response 94. The browser engine 90, processes the web page response 94, and presents a web page 88 to the GUI 84 for interaction with a user via the user terminal 76.

Figure 4:
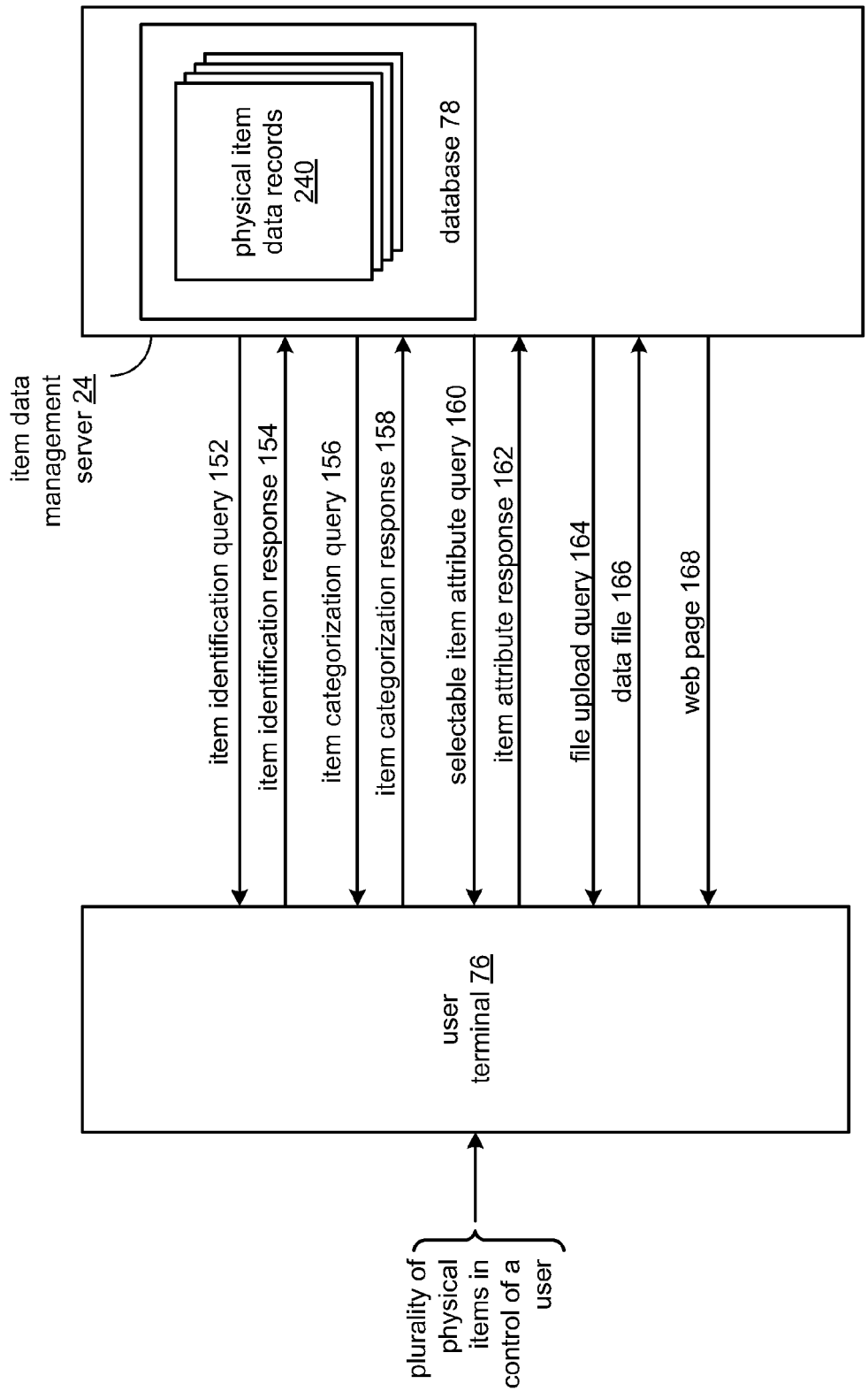
FIG. 4 is a block diagram depicting interaction between a user terminal and an item data management server according to an embodiment of the invention.

FIG. 4 is a block diagram depicting the interaction between user terminal 76 and the item data management server 24 to capture, store, organize, and present information regarding a plurality of physical items in the control of a user.

Through the user terminal 76, a user registers and pays a service fee through the subscription server 70 (see FIG. 2) for the service features available from the data item management sever 24. In the setup process, the subscription server 70 queries the user through the GUI 84 via software applications designed to illicit user information via the user terminal. The transactions and data transfer between the client and server takes place via a secured communications link.

With an account established, a user populates the database 78 with physical items in the control of the user, including images, physical item descriptions, physical item valuation information, condition or quality descriptions of the physical item, et cetera. In response to the user inputs, the item data management server 24 compiles a physical item data record 240 for each of the physical items in the control of the user in the database 78. Also through the subscription with the item data management server, the user is provided with access to the combined non-private portions of the physical items controlled by other users. The graphic user interfaces for entering information regarding a physical item and the physical item data record structure created by an item data management server are described in detail with reference to FIGS. 5 through 7.

In operation, the item data management server 24 presents an item identification query 152 to the user terminal 76. The item data management server 24 receives, in response to the item identification query, an item identification response 154 from the user terminal 76 that corresponds to and identifies a physical item controlled by the user. The item identification response 154 may include a simple object identifier of the physical item or a more detailed identifier. For example, when the physical item is a stamp, the item identification response 154 may simply be "collectible stamp," or as a more descriptive example, the item identification response 154 may be "1978 Fifty Cent Panda Commemorative Stamp." To preserve associated database capacity, the item identification response may be limited to a predetermined character length.

Based upon the item identification response 154, the item data management server 24 creates a physical item data record 240 corresponding to the physical item in the control of the user. Further, based upon the user subscription, the item data management server 24 alters the physical item data record 240 to indicate that the user is the creator of the physical item data record 240.

The item data management server 24 presents an item categorization query 156 to the user terminal 76, and receives, in response to the item categorization query 156, an item categorization response 158 from the user terminal 76 that identifies a category for association with the physical item in the control of the user. For simplicity, the item data management server 24 may provide a predetermined list of categories, as well as accepting a category submission generated by the user. An example of a predetermined list of categories is "Antiques, Art, Books, Comic Books, Coins, Jewelry, Sports Memorabilia, Stamps, Video Games," et cetera. Based upon the categorization response 158, the item data management server 24 alters the physical item data record 240 to include the category.

The item data management server 24 presents at least one selectable item attribute query 160 to the user terminal 76, the selectable item attribute query 160 is based upon the category included with the physical item data record 240. That is, the attributes stored in the physical item data record for a physical item provide as complete a description as possible for the physical item, making refined, specific Internet searches possible, reducing the time and effort for a user to update their knowledge of their physical items with respect to uniqueness, rarity, valuation, et cetera. Without such a structure, the search on an item-by-item basis would readily become tedious and overly time consuming. Further, the attributes stored in the physical item data record for a physical item also facilitate trading, barter, and community communication activities (such as a message board or a blog) related to the physical item.

As an example, if the category provided with the item categorization response 158 is "stamps," at least one attribute query is "stamp year." Other examples of attributes based upon the "stamp" category are those associated with acquisition of the stamp by the user, the valuation of the stamp, and the stamp characteristics. Examples of the attributes with respect to a category will be described in detail with respect to FIG. 7 in the context of a physical item data record 240.

The item data management server 24 receives, in response to the at least one selectable item attribute query 160, at least one item attribute response 162 from the user terminal 76 that identifies an attribute of the physical item in the control of the user. Based upon the at least one item attribute response 162, the item data management server 24 alters the physical item data record 240 to include the attribute included in the at least one item attribute response 162.

The item data management server 24 presents a file upload query 164 to the user terminal 76, and receives, in response to the file upload query 164, a data file 166. The item data management server 24 associates the data file with the physical item data record 240. The data file 166 may be an image file, a document file, and/or a media file that includes video data, voice data, audio data, image data, text data, or a combination thereof. The data file may also be provided as a link to the data file, where the link may be to a local document to the user terminal 76, or at another Internet Protocol address or other computer identifier, in which the item data management server 24 accesses and uploads the document using the document link. Also, documents, images, and media can be digitally signed (item ID plus account public identity) when uploaded.

With the populated physical item data record 240, the item data management server 24 creates a web page 168 that includes information from the physical item data record 240, an advertisement link based upon the physical item data record, and at least one other link selected based upon the physical item data record. The item data management server 24 presents the web page 168 to the user terminal 76. The details of the web page 168 are discussed with reference to FIG. 8.

Figure 5:
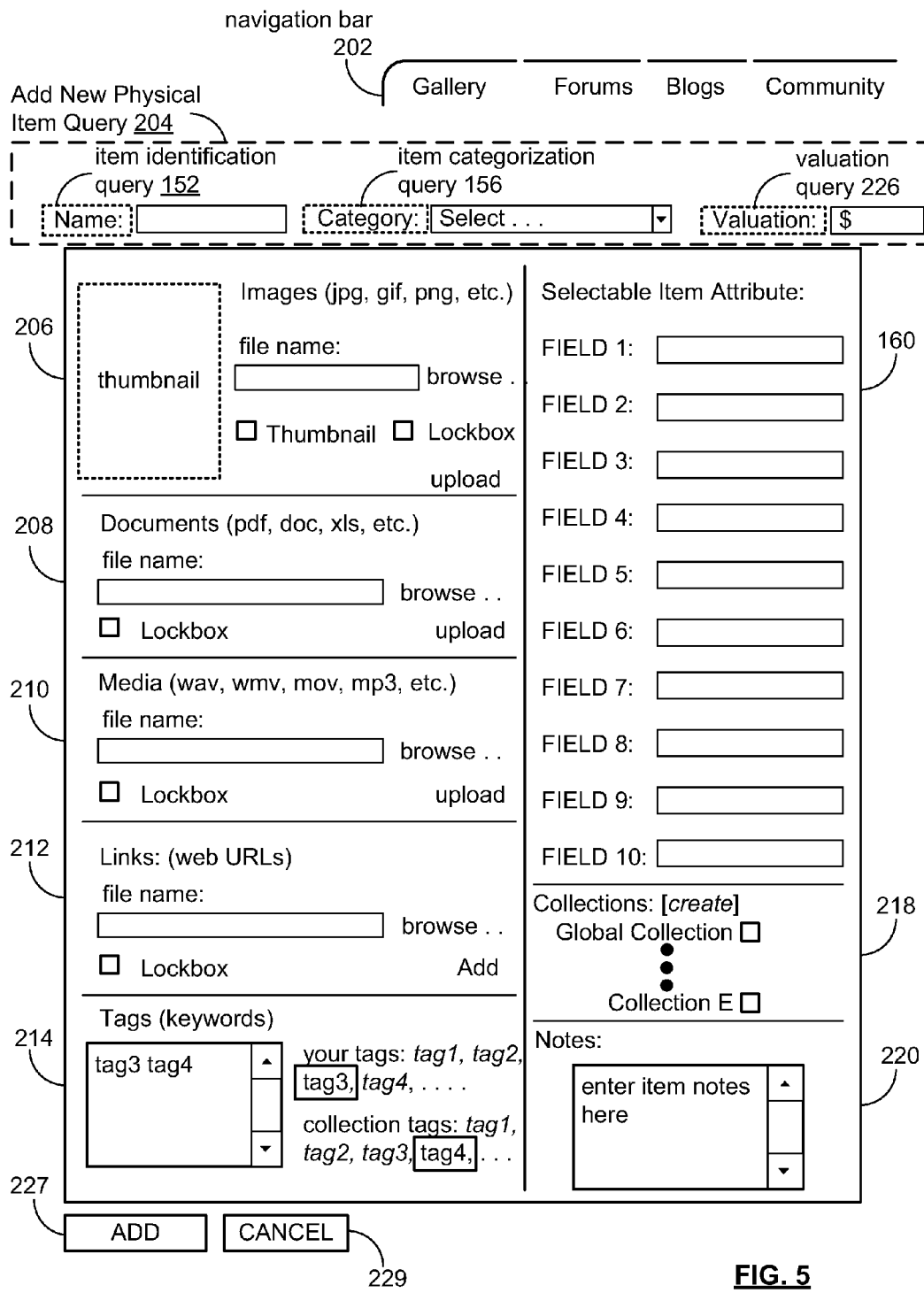
FIG. 5 is an illustration of an add physical item graphic user interface provided to the user for input and output through the user terminal according to an embodiment of the invention.

FIG. 5 is an illustration of an add physical item GUI 200 provided to the user for input and output through the user terminal 76. The item data management server 24 presents queries through the add physical item GUI 200 to the user terminal 76, and is able to receive responses to the queries and alter the physical item data record.

The add physical item GUI 200 includes a navigation bar 202, an add new physical item query field 204, a file upload query 164—including an image file upload query 206, a document file upload query 208, and a media file upload query 210, a link add query 212, a tag query 214, a physical item attribute query 216, a collections query 218, and item notes query 220.

The navigation bar 202 includes gallery, forums, blogs, and community commands commands for navigating to other functions within the web site supported by the item data management server 24. Generally, the navigation bar 202 provides a user with ready access to other features available by the item data management server 24. Accordingly, other commands may be placed in the navigation bar 202, such as search, collections, experts, contacts, et cetera. The add new physical item query field 204 includes an item identification query 152, an item categorization query 156, and a valuation query 226.

The item data management server 24 presents these queries for each of the plurality of physical items in the control of the user, and receives responses to these queries that are then used to create and alter physical item data records 240.

The file upload query 164, which includes the image file upload query 206, the document file upload query 208, and media file upload query 210 include fields for accepting file names with suitable file formats, as indicated by the file extensions, for the respective query. That is, for an image file, examples of suitable file formats for web page creation include jpg (Joint Photographic Experts Group), gif (Graphic Interchange Format), png (portable network graphics), tiff (Tagged Image File Format), et cetera. For a document file, examples of suitable file formats include pdf (Portable Document Format), xls (Excel), doc (Word format), et cetera. For a media file, examples of suitable file formats include wav (WAVeform audio), wmv (Windows Media Video), mov (Quicktime movie format), mp3 (MPEG Layer 3), et cetera.

The file names may be located using a directory browse feature to access the directory structure of the user terminal 76, or a distributed device associated with the user terminal 76. The filename and directory path are entered into the file name fields, and upon pressing the "upload" command, the item data management server 24 receives and associated data file 166, upon pressing the "upload" command within the respective queries.

The add link query 212 includes a file name or universal resource link ("URL") designation that may be received by the item data management server 24, which adds the hyperlink to the physical item data record 240, but not the linked object.

The item data management server 24 provides a lockbox option 213 with the image file upload query 206, the document file upload query 208, the media file upload query 210, and the link add query 212. The lockbox option causes the associated data file or link to be invisible to other users when the item is added to a collection that otherwise provides viewing and/or altering permissions to other users.

The tag query 214 receives tags, or keywords, from the user that the item data management server 24 associates with the physical item in the control of the user. The tag query 214 provides tags under a "your tags" basis or under a "collection tags" basis.

The item data management server 24 presents selectable item attribute query 160 to the user terminal 76. The selectable item attribute query 160 is based upon the category selected in the item categorization query 156. That is, the item data management server 24 provides a list of applicable attributes under the category. The user does not require pre-existing attributes associated with a category. Further, an information link can be associated with the attribute to provide information to the user when selected. In this manner, when information is sought regarding the physical item, the user does not need to research and formulate the attributes to retrieve suitable information from an Internet search engine—the item data management server 24 has created a database to efficiently retrieve pertinent information, including research materials, background, advertising solicitations, et cetera.

The number of fields available in the selectable item attribute query 160 varies according to the category selected in the item categorization query 156. For example, when the category is "stamps," the selectable item attributes presented in place of the "field" labels may be "Scott #," "Nationality," "Year," "Issue," "Denomination," "Grade," "Issue," "Grade," et cetera. The attributes are selected when the user places text in response to the attribute query.

The item data management server 24 presents a collections query 218, and receives in response a collections query response. The collections query response reflects the collections to which the physical item belongs. Generally, small businesses, groups, and individuals frequently have large collections of physical items, and maintenance and care of the collection require inventories and activity recording pertaining to individual physical items of the collection.

The item data management server 24 alters the physical item data record 240 to include an association with the selected collection reference data structures for the physical item. That is, when a physical item is included in a collection, the physical item data record 240 is updated to reflect the collection set in which it belongs. Collections are discussed in detail with respect to FIGS. 9 through 14.

The item data management server 24 also presents a notes query 220, in which the user may respond by placing text notes in the area provided. This query permits the user to provide idiosyncratic information regarding the physical item that may not be otherwise addressed through the item categorization query 156 and the selectable item attribute query 160 based upon the category. The notes query 220 may also accept a "tell a story" entry regarding the pedigree, lineage, or interesting story of how the physical item came into the possession of the user.

When the user has entered or provided responses to the queries of the add physical item GUI 200, the user may respond by pressing the "ADD" command 227. In the alternative, the user may not respond by pressing the "CANCEL" command 229.

The "ADD" command transmits, and the item data management server 24 receives, the responses from the respective query fields. With this information, the item data management server 24 creates a physical item data record 240 in response to the item identification query, alters the physical item data record 240 to indicate that the user is the creator of the physical item data record, and alters the appropriate fields of the physical item data record 240 with the responses provided by the user.

Figure 6:
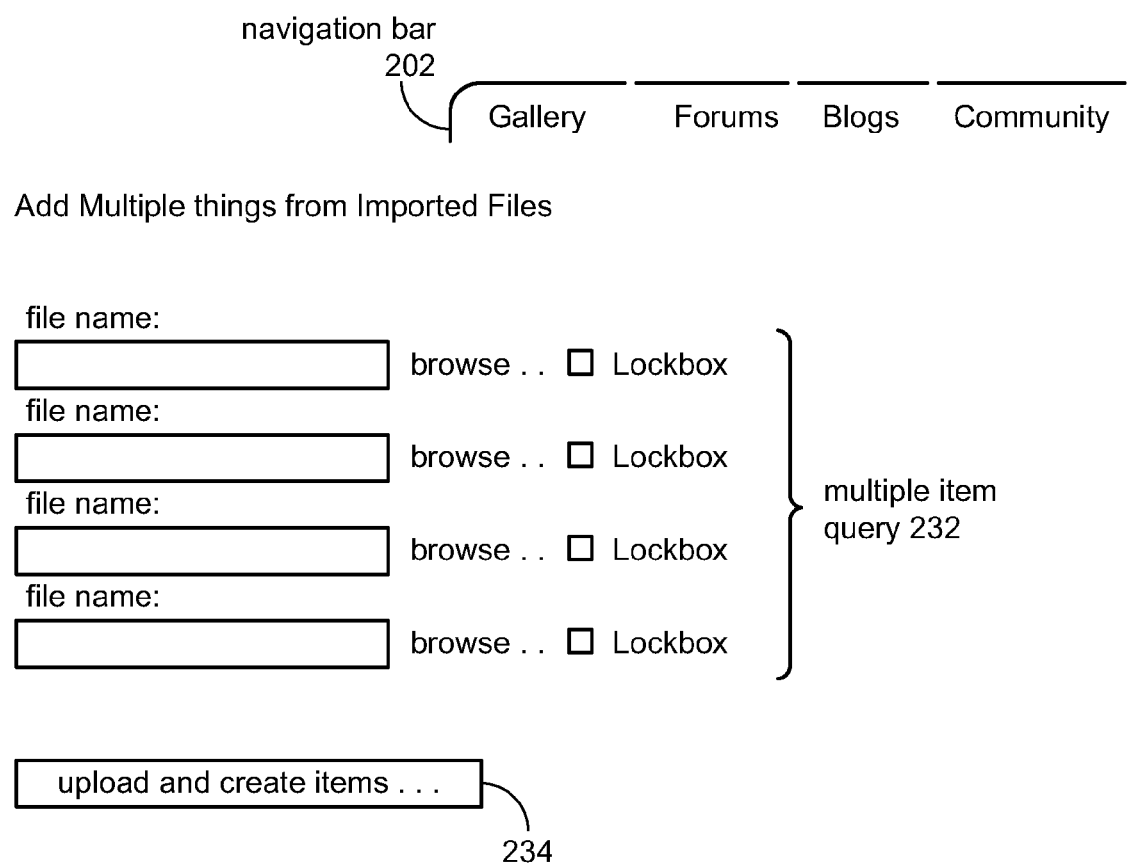
FIG. 6 is an illustration of a multiple item import graphic user interface that may be provided to a user for input and output through the user terminal according to an embodiment of the invention.

FIG. 6 is an illustration of a rapid item import GUI 230 that the item data management server 24 may provide to a user for input and output through the user terminal 76. The rapid item import GUI 230 provides an imported files query 232, which takes advantage of user database or list files having a dissimilar application file formats to that of the database 78, yet contain a plurality of physical items in the control of the user. When receiving a multiple item query response, the item data management server 24 uses a conversion utility to convert data from other file formats (such as Excel, TurboTax, Quickbooks, Quicken, et cetera) to populate a plurality of physical item data records of the database 78.

The multiple item query 232 includes file name fields to receive file names that may be directly entered or may be located using a directory browse feature to access the directory structure of the user terminal 76, or a distributed device associated with the user terminal 76. The filename and directory path are entered into the file name fields, and upon pressing the upload and create items command 234, the item data management server 24 receives and creates physical item data records 240 for the physical items identified from the uploaded files.

Rapid item import may also be provided via a graphic image file, in which multiple items are represented. The item data management server 24 provides a utility to automatically parse the individual physical items from the file. The parsed images can then be selected by the user for inclusion in the database 78 of the item data management server 24 as physical item data records through the add physical item GUI 200.

Figure 7:
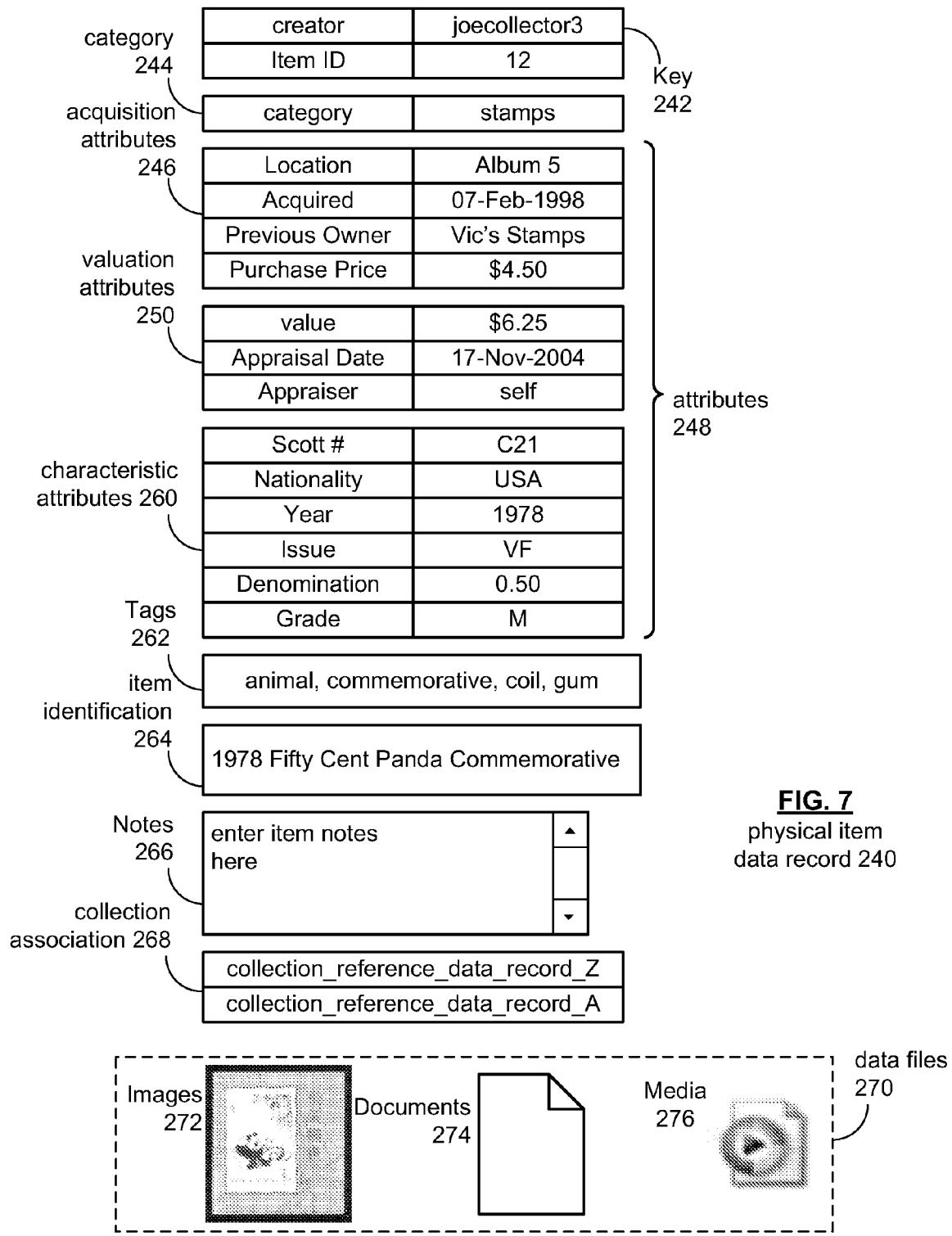
FIG. 7 is an illustration of a physical item data record according to an embodiment of the invention.

FIG. 7 is a an illustration of a physical item data record 240 according to an embodiment of the invention. The item data management server 24 stores, alters, and organizes the physical item data record 240 in a database 78. As noted earlier, the item data management server 24 alters the physical item data record with received query responses from the user terminal 76. Further, for new database entries regarding physical items in the control of a user, the item data management server 24 creates a physical item data record for that physical item.

The physical item data record 240 is not a static database structure, but may change as activity occurs with respect to physical item in the control of a user. Examples of change include the addition of information, or information updates (that may result from commercial transactions involving the physical items), valuation activity, appraisal activity, et cetera.

The physical item data record 240 includes a key 224, a category 226, attributes 216, tags 214, item identification 222, notes 220, and data files 166. The attributes 216 include acquisition attributes 228, valuation attributes 236, and characteristic attributes 238. The key 224 has a creator field and an item ID field. With the login or registration of the user, the item data management server 24 alters the physical item data record 240 to indicate that the user is the creator. The item ID is generated by the database server application. The category field 226 is contains result of the categorization response 158.

The attributes 216 are based upon the result of the categorization response 158, physical item data record conforms to the attributes. That is, the attributes change based upon the category received in the categorization response 158.

Figure 8:
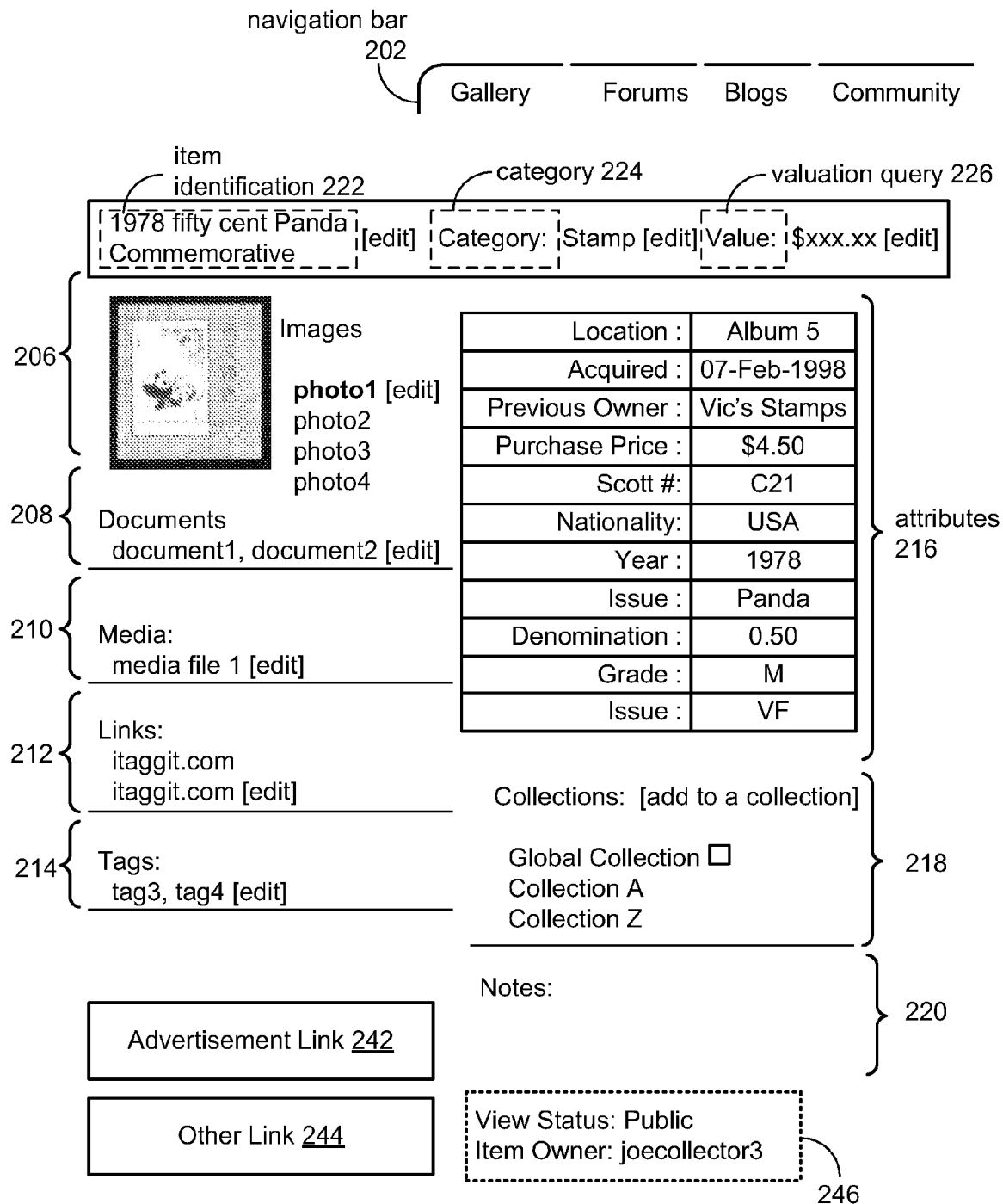
FIG. 8 is an illustration of a web page created by the item data management server according to an embodiment of the invention.

FIG. 8 is an illustration of a web page 168 created by the item data management server 24 according to an embodiment of the invention. The web page 168 formats and presents information from the physical item data record 240, an advertisement link 242 based upon the physical item data record, and at least one other link 244 based upon the physical item data record.

The web page 168 includes a navigation bar 202, an item identification 222, a category 224, and a valuation 226. The information from the physical item data record 240 is shown in an image field 206, a document field 208, a media field 210, a link field 212, a tag field 214, attributes fields 216, a collection field 218 and notes field 220. The web page 168 may also include the status identifier field 246, which identifies whether the item is public, and the owner of the physical item.

The advertisement link 242 is based upon the physical item data record 240 with respect to an attribute and/or category associated with the physical item. That is, as the item data management server 24 alters the physical item data record 240 based upon query responses, the advertisement link 242 changes. For example, as the value or appraised valuation of a physical item increases, the advertisement link 242 may provide sales and/or commercial transaction links to an on-line auction house. The other link 244 may be an additional advertisement link, or may be a resource link relating to additional information or background relating to the physical item identified in the physical item data record with respect to at least one attribute and/or category associated with the physical item. Further, the advertising link 242 and the other link 244 may be transitioning links. That is, the item data management server 24 changes the links upon a web page refresh initiated by the user, by the browser client 82 (based upon a refresh timer), or as the item data management server 24 may push to the user terminal 76 on a periodic basis.

That is, the item data management server 24 provides targeted advertising (such as banner ads targeted to a specific item attribute and/or category) as well as affiliate modules for linking hypertext data directly into the web page 168 (that is, book collections directly into a bookstore online search engine). The advertising link 242 may also be provided as contextual searching, and the item data management server 24 may incorporate such a feature through third party vendor applications and/or services such as Google Adsense. Following enrollment, the Adsense application enables the item data management server 24 to provide text and image advertisements in the created web pages presented to the user terminal. The Google search generates advertisement links based on website content (that is, the physical item data records), the user's geographical location, and other factors.

FIG. 9 is an illustration of a collection summary web page 280 created by the item data management server 24 according to an embodiment of the present invention. The collection summary web page 280 summarizes the collections relating to the user.

The collection summary web page 280 includes a navigation bar 202, a collection identifier field 282, a collection owner field 284, a collection type/community field 286, a collection valuation field 288, an items field 290, and an edit/add collection query 292.

The collection identifier 282 is a unique identifier to permit an assembly or inclusion of physical item data records under a specific collection. As indicated in the collection owner field 284, the collection may be specific to the user, or may be a collection created by another user of the item data management server 24 in which the present user has been granted permission to view and/or alter the physical item data record. The collection type/community field 286 specifies whether the collection is private or shared. When private, the collection is only accessible by the user. When shared, the collection may be accessed by other users of the item data management server 24. Further when shared, and the collection belongs to the user (that is, "[me]"), the user may designate the access permissions by other users to the collection. Generation of a community of users is discussed in detail with respect to FIGS. 11 through 13.

The collection valuation field 288 reflects the valuation total for a respective collection as a whole (as distinguished by the value of its individual items). By setting up different collections, a user may be able to determine which combinations of physical item data records have a greater value than others. The items field indicates the number of physical item data records that are associated with a collection. The collection, when shared, permits other users to add their physical item data records to the collection, forming virtual sets that can be valuated and appraised. The significance being that the valuation of a collection may be greater than the valuation of the individual physical items that make up the collection. These information aids the user in decisions to enter into commercial transactions to buy or sell items relating to a given collection.

The collection summary web page 280 also includes a create collection query 268, which the item data management server 24 presents to the user terminal 76. When create collection query 292 is pressed, the item data management server 24 receives a collection creation response from the user terminal 76. Collection population, community generation/creation, and collection views are discussed in detail with reference to FIGS. 10 through 14.

Figure 10:
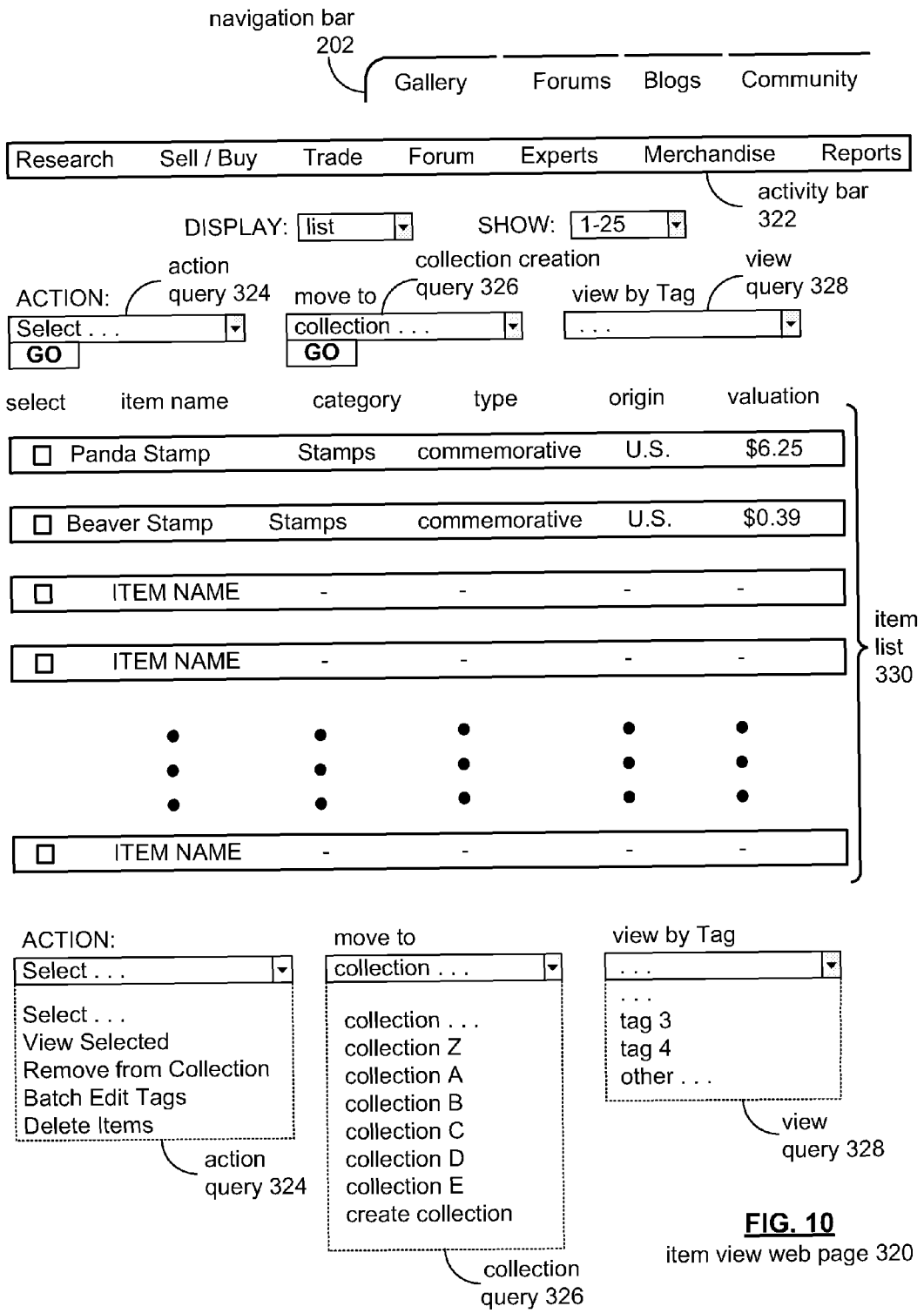
FIG. 10 is an illustration of an item view web page that the item data management server presents to the user via the user terminal according to an embodiment of the invention.

FIG. 10 is an illustration of an item view web page 320 that the item data management server 24 presents to the user through the user terminal 76 according to an embodiment of the invention. The item view web page 320 presents, in summary fashion, an item list 330 having underlying physical item data records for the physical items in the control of the user which have been created and/or modified by the item data management server 24. The item view web page 320 provides information for a physical item that includes include the "item name," the "category" and "type" assigned to the physical item, the "origin" regarding the geographic origin of the physical item (country and/or region), and a "valuation" for the physical item.

The item view web page 320 also presents queries to a user terminal 76 including an action query 324 and a collection query 326. For an action query 324 or a collection query 326 to act with respect to a physical item, the item is selected from the item list 330. An item is selected by a user clicking on a selection box to place a "check" icon, thus selecting the item. In this manner, a plurality of physical item data records 240 may be associated with a collection reference data record through the collection query 326.

The collection query 326 also presents to a user terminal 76 a list of selectable user created collections (such as those named collection Z, A, B, et cetera) for associating the physical item record with a collection. The user may have created one or all of the collections, while others may have been created by other subscribers to the item data management server 24. The collection query 326 also presents the user with an opportunity to select "create collection" to create additional collections when the list does not provide one suitable to the user. Creation of an edit/create collection GUI is discussed in detail with reference to FIG. 11.

The action query 324 presents to user terminal 76 a list of multiple possible actions to a selected item (or items) in the item list 330. For example, the action query 324 allows the user to provide a response of "View Selected," (in which the item data management server 24 creates a web page 168), "Remove from Collection," "Batch Edit Tags," and/or "Delete Items."

The activity bar 322 provides action commands to a user for activities for the physical items. Examples of activities are research an item (such as for colors, construction, rarity, et cetera), sell or buy a physical item, initiate or respond to trade inquiries with other users, engage in forum discussions regarding an item, seek merchandising information for an item, generate reports on the physical item data records for the physical items, et cetera.

Figure 11:
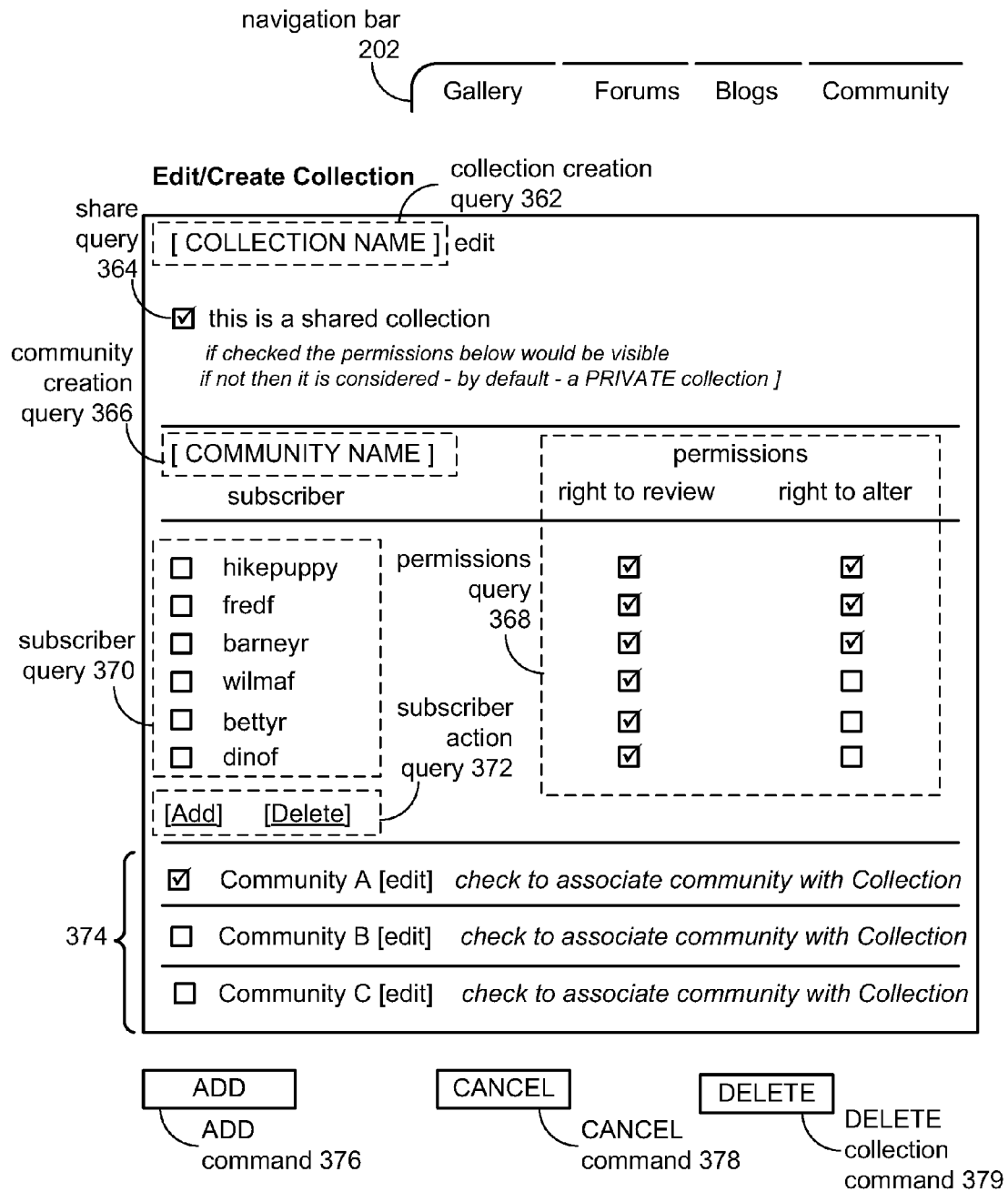
FIG. 11 is an illustration of an edit/create collection graphic user interface according to an embodiment of the invention.

FIG. 11 is an illustration of an edit/create collection GUI 360 according to an embodiment of the invention. The edit/create collection GUI 360 includes a navigation bar 202, a collection creation query 362, a community creation query 366, a permissions query 368, a subscriber query 370, a subscriber action query 372, a community list 374, an "ADD" query 376, a "CANCEL" query 378, and a "DELETE" query 379.

The item data management server 24 presents the edit/create collection GUI 360 when a user selects "create collection" from the item view web page 320 (see FIG. 10), the "create collection query 292" from the collection summary web page 280 (see FIG. 9), "add to a collection" from the collections field 218 (see FIG. 8), et cetera. Depending on the permissions provided through an associated community of users, a user may edit a collection created by another user.

Through the edit/create collection GUI 360, the item data management server 24 presents a collection creation query 362 to the user terminal 76. The user, through the user terminal 76, responds with a collection query response in the provided field. When the user does not elect to share the collection by leaving the share query 364 unselected, the item data management server 24 receives the collection query response when the user presses the "ADD" command 376.

When the user elects to share a collection, the user "checks" the share query 364. When the share query 364 is checked, the item data management server 24 presents a community creation query 366 via the edit/create collection GUI 360. The user enters a community creation response, such as a community name, to the community creation query 366. The subscriber query 370 allows the user to associate a plurality of subscribers with the community creation query 366. Through the subscriber action query 372, the user may add additional subscriber identifiers to the subscriber query 370, or delete subscribers from the subscriber query 370, when checked, by selecting the delete command.

Associated with the subscriber query 370 is the permissions query 368. The user selects permissions to the subscribers of the subscriber query 370 to specify access rights to specific users and/or groups of users associated with a community. In other words, permissions allow a user to control the ability of others to view or make changes to the contents of a collection within the control of the user. In this manner, a first group of subscribers to be associated with the community reference data structure have both a right to review and a right to alter a physical data item data record contents of the collection data structure by adding records or deleting records from the collection data structure, and a second group of subscribers of the plurality of subscribers associated with the community reference data structure have the right to review but not the right to alter the physical item data record contents of the collection data structure.

Also, when a user specifies access rights to their collection, an invitation query may also be generated and provided to the specified users and/or groups of users. Responses to the invitation query then confirm whether or not the other users will participate in the shared collection.

The edit/create collection GUI 360 allows other communities of a plurality of communities 374 to be associated with the collection being created under the collection creation query 362. Further, the user is able to edit existing communities where the user is the creator. The user may change the subscriber affiliations for communities when users are added to the item data management server 24. Notably, also, the item data management server 24 may update the subscriber list for a community when items are conveyed or are sold to other users, allowing a user to maintain a collection while the user control information is updated through an underlying physical item data record 240.

When the user presses the ADD command 376, the item data management server 24 receives the responses that the user enters to the queries. In this manner, the item data management server 24 presents the collection creation query 362 to the user terminal 76, and receives, in response to the collection creation query, a collection creation response from the user terminal 76. The item data management server 24, based upon the collection creation response, creates a collection reference data structure, which is discussed in detail with reference to FIG. 12. In the alternative, the user may press the CANCEL command 378 to exit without sending a response to the queries being sent to the user terminal 76. Further, the user may delete the collection by pressing the DELETE collection command 379.

Figure 12:
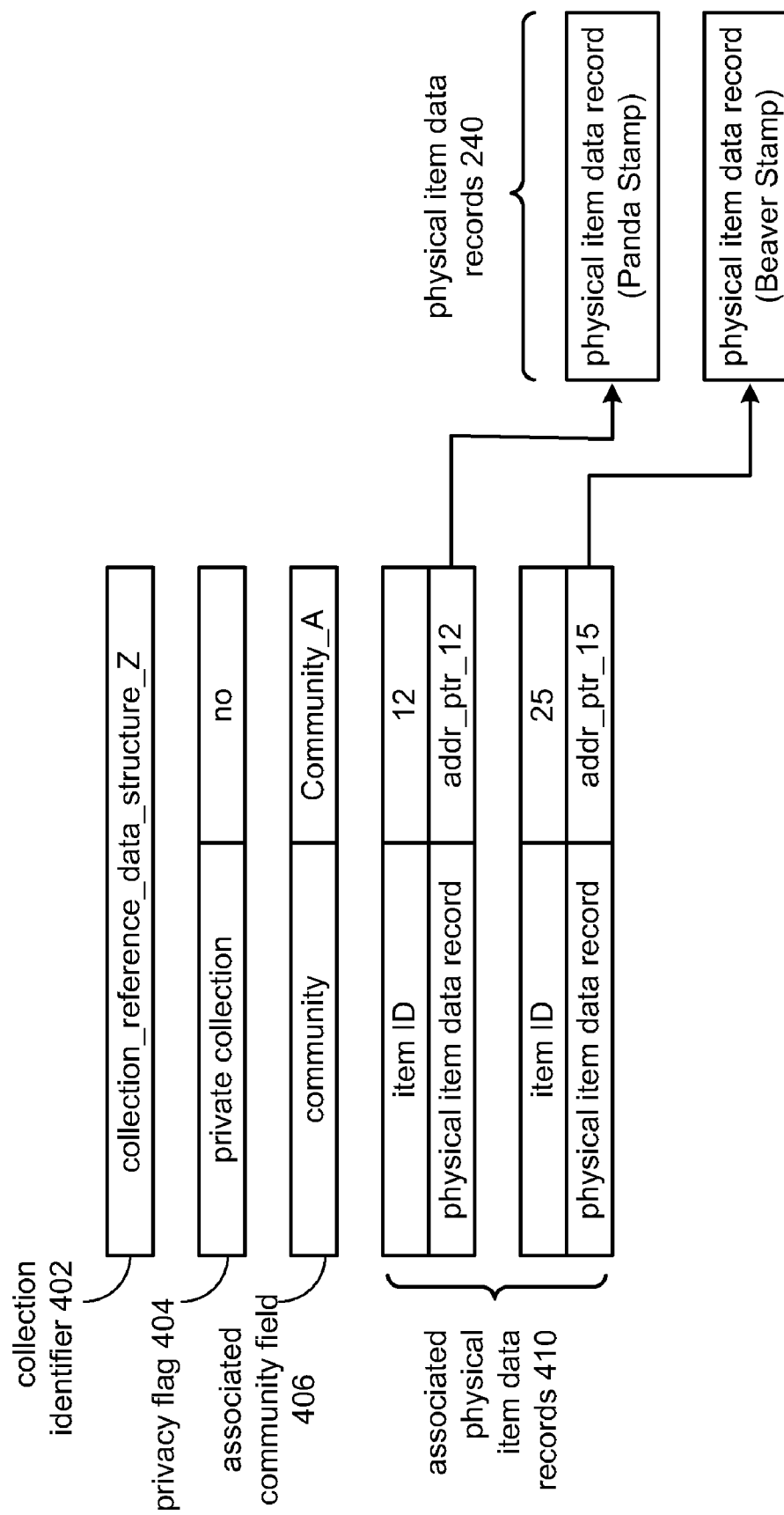
FIG. 12 is an illustration of a collection reference data structure according to an embodiment of the invention.

FIG. 12 is an illustration of a collection reference data structure 400 in accordance with an embodiment of the invention. The collection reference data structure 400 includes a collection identifier 402, privacy flag 404, an associated community (or communities) 406, subscriber fields 408, and associated physical item data records 410.

The collection identifier 402 designates an identifier for the collection reference data structure 400. The privacy flag 404 indicates whether the collection is private to the creating user, or whether it is public in nature, either to all subscribers to the item data management server 24, or to a specified group of users. When the privacy flag 404 indicates that the collection is private to the creating user, then the item data management server 24 would not access the community reference data structure relating to the associated community field 406.

When the privacy flag 404 is not set, or indicates that the collection is not private, then the item data management server 24 accesses the community reference data structure 420 related to the associated community field 406. The community reference data structure 420 is discussed in detail with reference to FIG. 14.

The associated physical item data records 410 are associated with the collection reference data structure 400. The item data management server 24 associates the physical item data records with the collection reference data structure 400, and alters the physical item data record (see FIG. 7) for the item to include an association with the collection reference data structure 400. The associated physical item data records 410 are associated through links or pointers to the physical item data records 240, such as indicated by item IDs (such as item ID 12 for the "Panda Stamp," and item ID 25 for the "Beaver Stamp") 25. In the example provided, collection Z is associated with the physical item data records 240 for the "Panda Stamp" and for the "Beaver Stamp." Based upon the collection reference data structure 400, the item data management server 24 creates a collection web page 440, which is discussed in detail with reference to FIG. 14.

FIG. 13 is an illustration of a community reference data structure 420 according to an embodiment of the invention. The community reference data structure 420 includes a community identifier 422, a creator identifier 423, and subscriber fields 424. The subscriber fields 424 include subscriber identification fields 426, subscriber name fields 428, and permission fields 430.

The community reference data structure 420 results from the community creation query presented to the user terminal 76 via the community creation query 366 of the edit/create collection GUI 360 (see 11). The item data management server 24 receives, in response to the community creation query, a community creation response from the user terminal 76, and based upon the community creation response, creates a community reference data structure 420.

The creator identifier 423 identifies the creator belonging to the community. In this example, the creator is "joecollector3." The default permissions that the creator possesses are full permissions to review and alter physical item data records. The item data management server 24 associates a plurality of subscribers with the community reference data structure in the subscriber fields 424. Each field of the subscriber fields includes the subscribe identification fields 426 to provide a subscriber "key" for the database 78, the subscriber name field 428 stores the user names or "on-line" identity of the subscriber, and the permission fields 430 store the permissions the creator provides to each of the subscribers through the edit/create collection GUI 360 to alter the physical item data record contents of the collection reference data structure 400 (that is, whether they have a right to add physical item data records to, or delete physical item data records from, the collection reference data structure). In the example of FIG. 13, a first group of subscribers have both a right to review and a right to alter physical item data record contents of the collection data structure 400, and a second group of subscribers have the right to review but not the right to alter (as indicated by the "strike through" marks) the physical item data record contents of the collection reference data structure 400.

Figure 14:
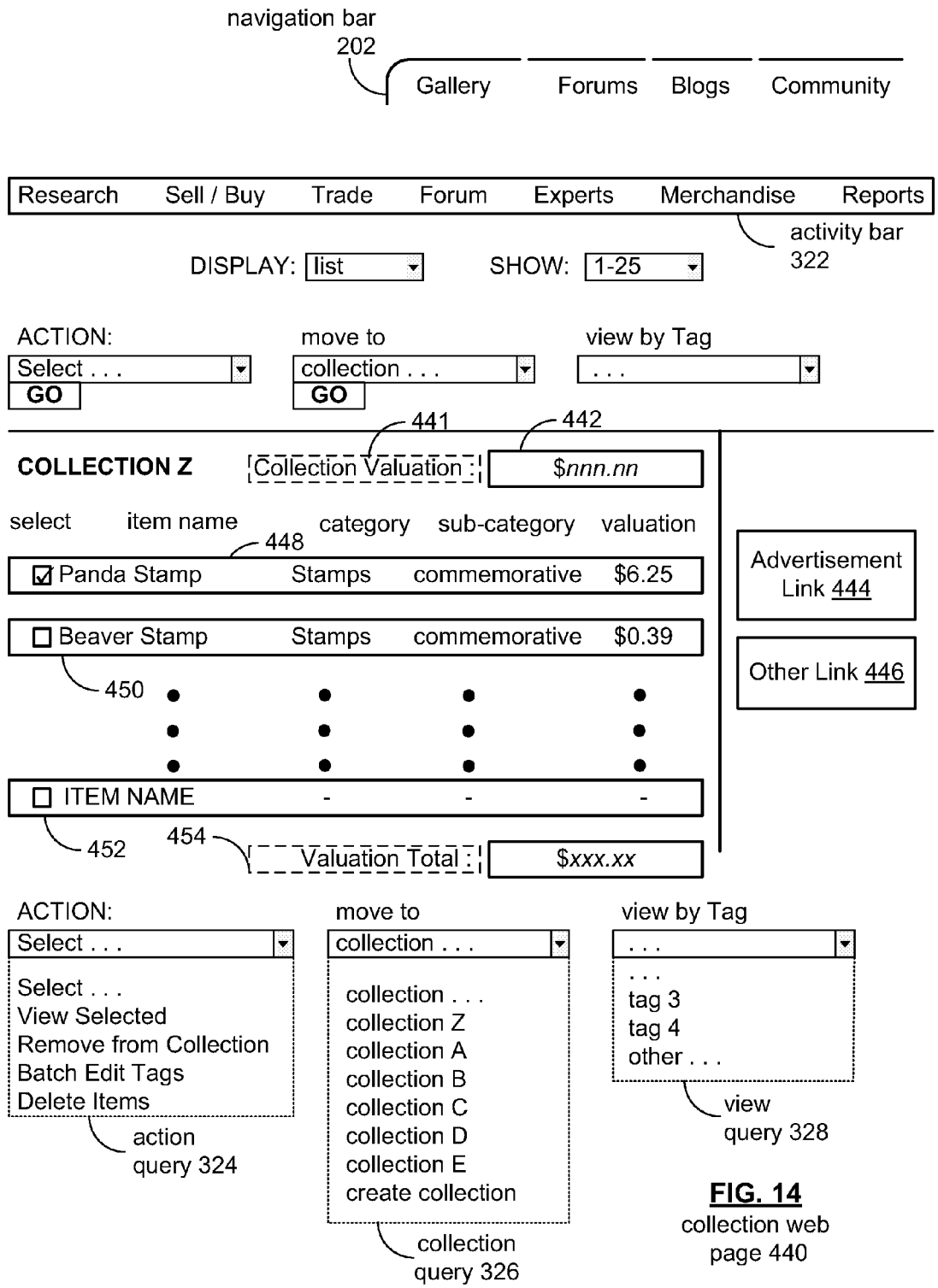
FIG. 14 is an illustration of a collection web page according to an embodiment of the invention.

FIG. 14 is an illustration of a collection web page 440 according to an embodiment of the invention. The collection web page includes a listing of the plurality of physical item data records 448-452 associated with the collection reference data structure 400, and an advertisement link 444 and an other link 446, each of which may be related to the category designation of the physical item data records or attributes of the physical item data record for the physical items.

The collection web page 440 also presents queries to a user terminal 76 including an action query 324 and a collection query 326. For an action query 324 or a collection query 326 to act with respect to one (or several) of the physical item data records, the item is selected by a user clicking on a selection box to "check" to select the item.

The action query 324 presents to the user terminal 76 a list of multiple possible actions to a selected item (or items) in the item list 330. For example, the action query 324 allows the user to provide a response of "View Selected," "Remove from Collection," "Batch Edit Tags," and/or "Delete Items." The collection query 326 presents to the user terminal 76 a list of categories for moving a selected item to another collection, or to add the item to another collection, as well as creating another collection based upon the selected physical item data records.

The collection valuation field 442 may be a value greater than the individual pieces of the collection that is reflected in the valuation total field 454. That is, a complete set may have the greatest value, and by providing the collection to a community, additional valuations potentials are available. The collection, when shared, permits other users to add their physical item data records to the collection, forming virtual sets that can be valuated and appraised. The significance being that the valuation of a collection may be greater than the valuation of the individual physical items that make up the collection. These information aids the user in decisions to enter into commercial transactions to buy or sell items relating to a given collection. Processing and determining valuation for a physical item in the control of a user is discussed in detail with reference to U.S. patent application Ser. No. 11/521,891, entitled "Processing & Determining Valuation over a Data Network For A Physical Item in the Control of a User," filed Sep. 15, 2006, which is hereby incorporated herein by reference.

The advertisement link 444 is based upon the collection reference data structure 400 and the associated plurality of physical item data records 240. The advertisement link may be based upon the valuation total 454 for the collection, attributes of the plurality of items in the collection, and/or upon the category or categories associated with the physical items. That is, when the item data management server 24 alters the physical item data record 240 for a physical item, the advertisement link 242 may change to reflect the addition of newer information. For example, as the value or appraised valuation of a physical item increases, the advertisement link 444 provides sales or transaction links to an on-line auction house. The other link 446 may be an additional advertisement link, or may be a resource link relating to additional information or background relating to the physical item identified in the physical item data record with respect to at least one attribute and/or category associated with the physical item. Further, the advertising link 444 and the other link 446 may be transitioning links. That is, the item data management server 24 changes the links upon a web page refresh initiated by the user, by the browser client 82 (based upon a refresh timer), or as the item data management server 24 may push to the user terminal 76 on a periodic basis.

In response to selection by the user of the advertisement link 444 presented on the collection web page 440, the item data management server 24 transmits a web page request to an ecommerce server, such as ecommerce server 26 (see FIG. 1). The item data management server 24 services a transaction with the user via the user terminal 76 and the ecommerce server 26, and receives a transaction report from the ecommerce server 26 reporting the transaction with the user via the user terminal 76 to the item data management server 24.

Figure 15:
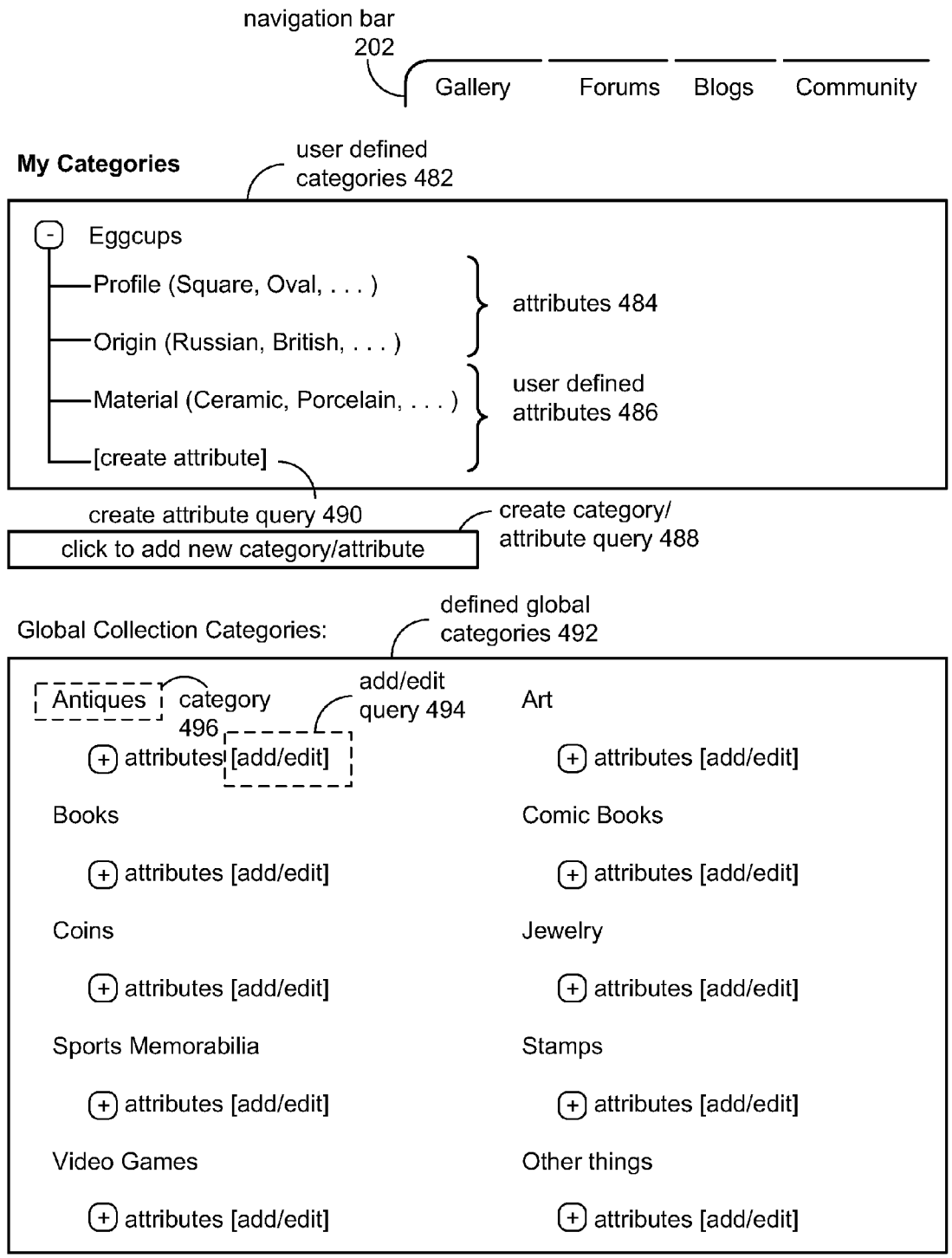
FIG. 15 is an illustration of a category graphic user interface according to an embodiment of the invention.

FIG. 15 is an illustration of a category GUI 480 according to an embodiment of the invention. The category GUI 480 includes user defined categories 482, a create category/attributes query 488, and a defined global categories 492. The user defined categories 482 each include a create attribute query 490.

The category GUI 480 provides a plurality of global collection categories 490 that includes at least one category 496 with associated attributes. The associated attributes may be added and/or edited via the add/edit query 494 based upon responses to the query by a user.

The user defined categories 482 include attributes 484, which the item data management server 24 may include as associated with the categories, and further may include user defined attributes 486. The create attribute query 490 allows a user to add attributes to a user-defined category through query responses. Also, the create category/attribute query 488 allows a user to add additional categories and associated category attributes in addition to those that the item data management server 24 provides as default categories.

The category GUI 480 operates to facilitate the addition of categories, attributes and/or classes for customizing the Global Collection Categories available for categorizing the physical items in the control of the user. For example, a user defined category of "Eggcups" is added to the Global Collection Categories via the user defined categories 482. The item data management server 24 associated attributes 484 with the user-defined category, such as a profile attribute, an origin attribute for the "Eggcups" category. With respect to user defined attributes, a user may add additional attributes as desired through the create attribute query 490 for association with a given user defined category. For example, a user defined attribute of "Material" provides collection of this attribute.

Figure 16A:
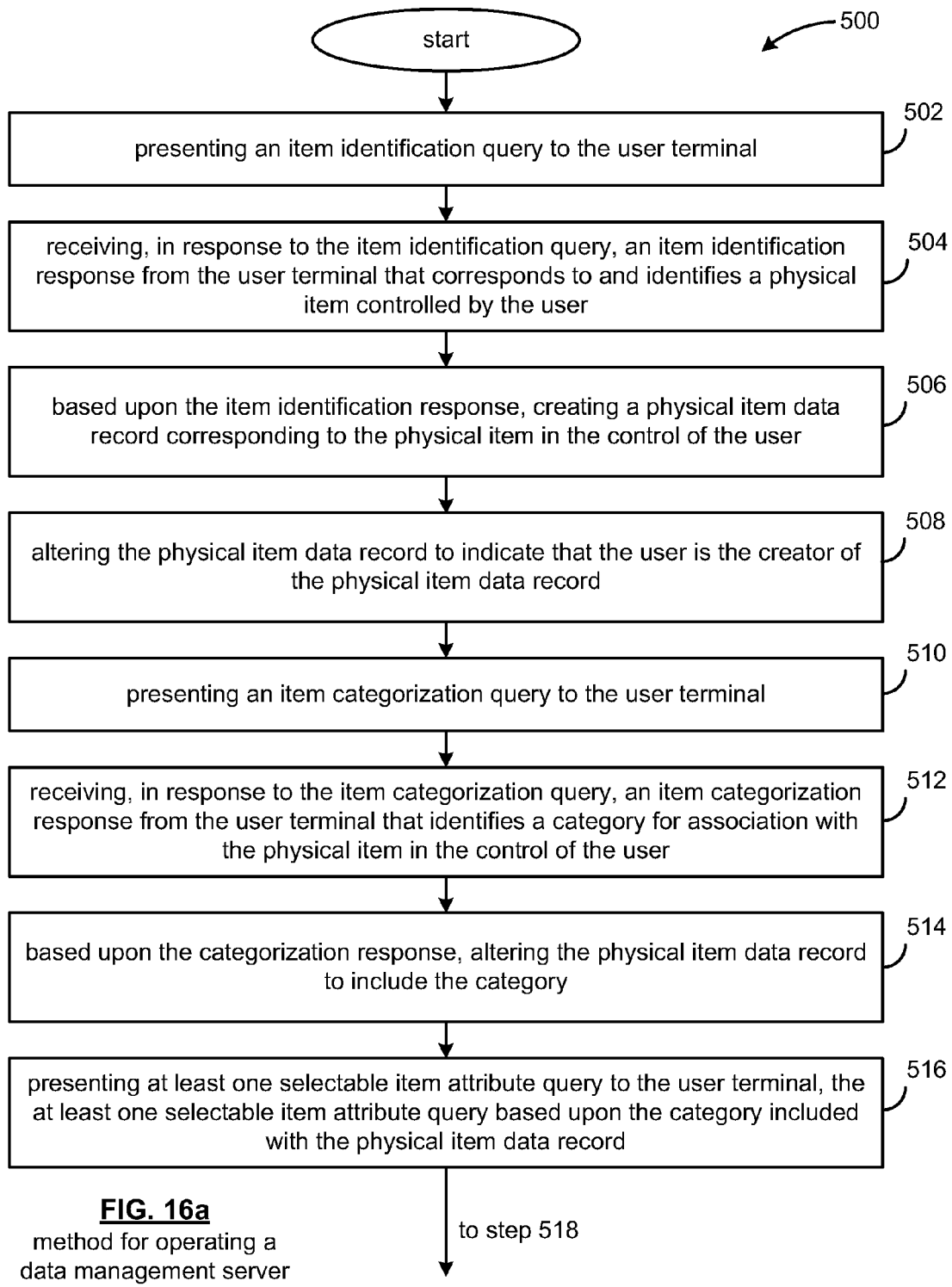
FIGS. 16a and 16b are flow diagrams illustrating a method in an item data management server to capture, store, organize, and present information regarding a plurality of physical items in the control of a user according to an embodiment of the invention.
Figure 16B:
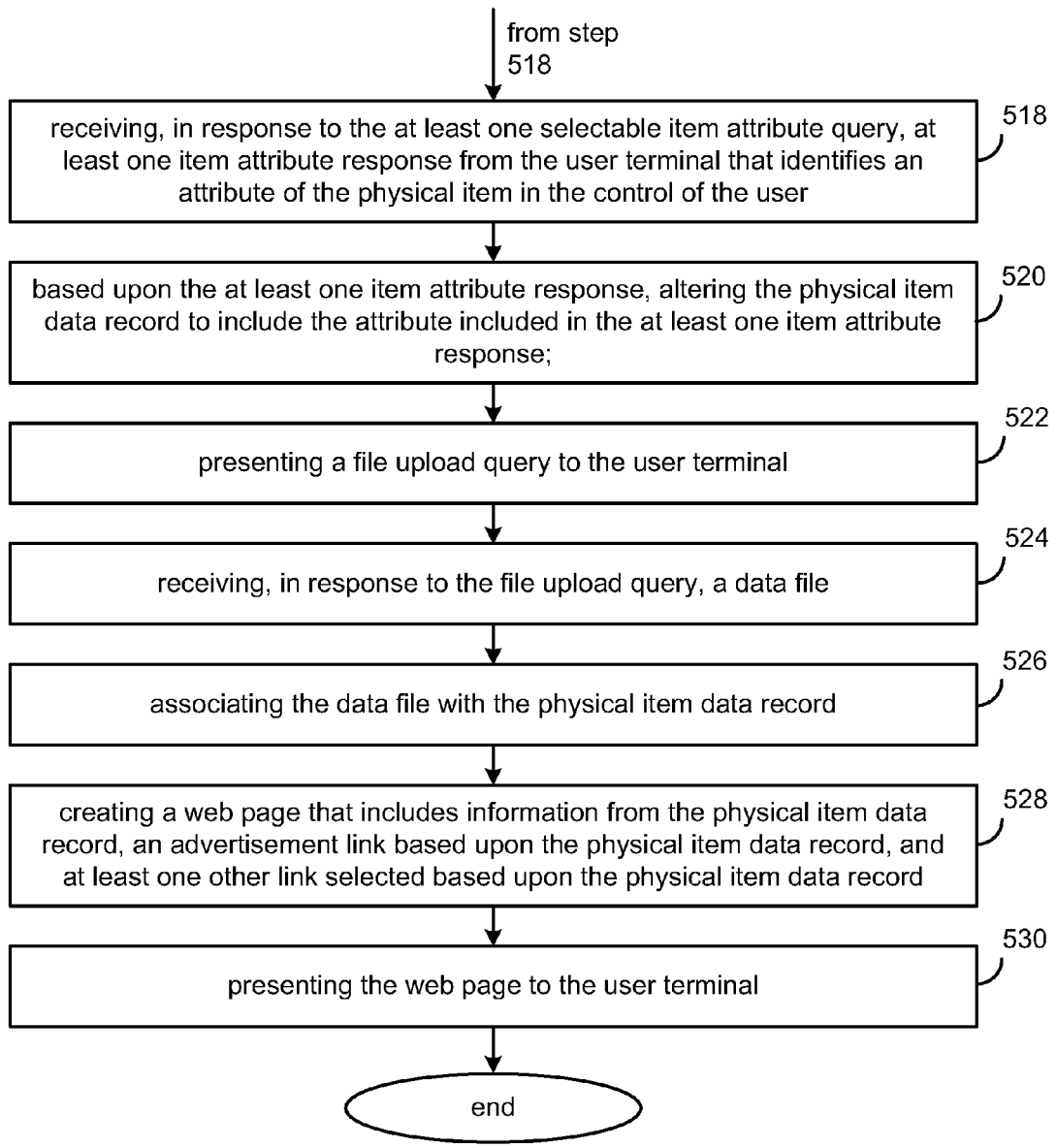

FIGS. 16a and 16b are a flow diagram illustrating a method 500 in an item data management server to capture, store, organize, and present information regarding a plurality of physical items in the control of a user according to an embodiment of the invention.

Beginning at step 502, the item data management server 24 presents an item identification query to the user terminal. The item data management server receives at step 504, in response to the item identification query, an item identification response from the user terminal that corresponds to and identifies a physical item controlled by the user. Based upon the item identification response, the item data management server creates at step, 506 a physical item data record corresponding to the physical item in the control of the user, and alters the physical item data record to indicate that the user is the creator of the physical item data record at step 508.

At step 510, the item data management server presents an item categorization query to the user terminal, and receives, in response to the item categorization query, an item categorization response from the user terminal that identifies a category for association with the physical item in the control of the user at step 512. Based upon the categorization response, the item data management server alters the physical item data record to include the category at step 514.

At step 516, the item data management server presents at least one selectable item attribute query to the user terminal. The at least one selectable item attribute query is based upon the category included with the physical item data record. The item data management server receives at step 518, in response to the at least one selectable item attribute query, at least one item attribute response from the user terminal that identifies an attribute of the physical item in the control of the user. Based upon the at least one item attribute response, the item data management server alters the physical item data record to include the attribute included in the at least one item attribute response at step 520.

At step 522, the item data management server presents a file upload query to the user terminal and at step 524 receives, in response to the file upload query, a data file, which is associated with the physical item data record at step 526.

At step 528, the item data management server creates a web page that includes information from the physical item data record, an advertisement link based upon the physical item data record, and at least one other link selected based upon the physical item data record. At step 530, the item data management server presents the web page to the user terminal.

Figure 17:
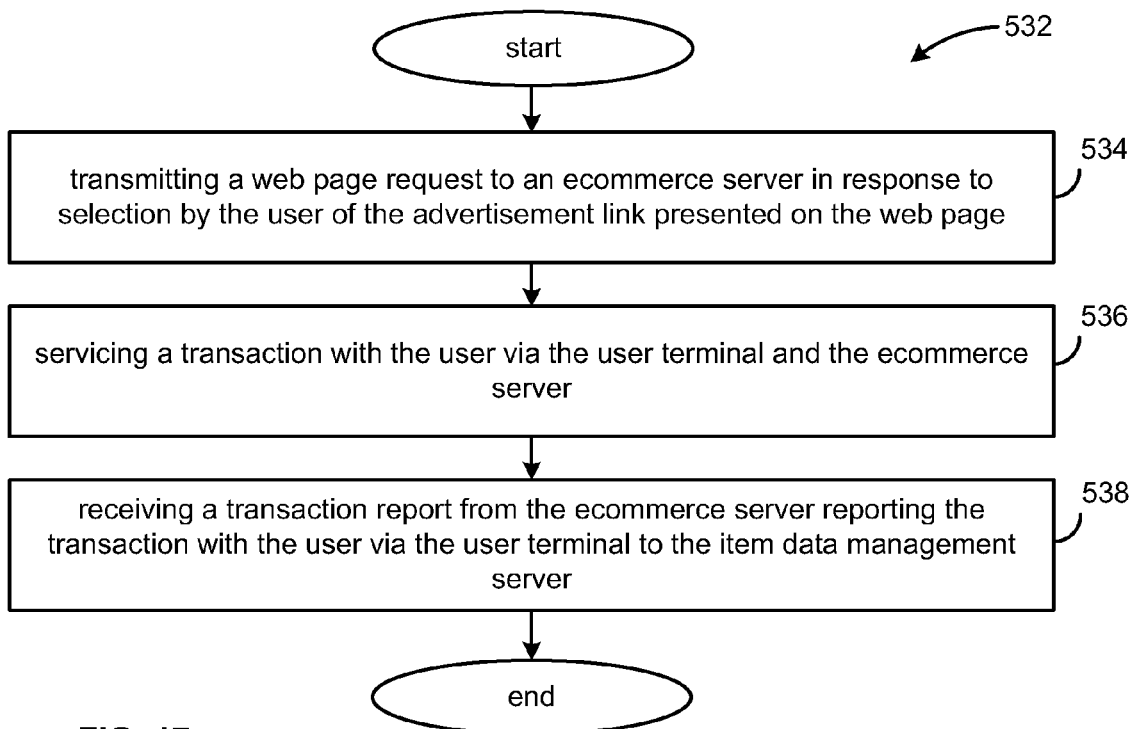
FIG. 17 is a flow diagram illustrating a method for further engaging an ecommerce server according to an embodiment of the invention.

FIG. 17 is a flow diagram illustrating a method 532 for further engaging an ecommerce server according to an embodiment of the invention.

In response to selection by the user of the advertisement link presented on the web page, the item data management server at step 534 transmits a web page request to an ecommerce server, such as ecommerce server 26 (see FIG. 1). The item data management server services a transaction with the user via the user terminal and the ecommerce server at step 536, and receives a transaction report from the ecommerce server at step 538 reporting the transaction with the user via the user terminal to the item data management server.

Figure 18:
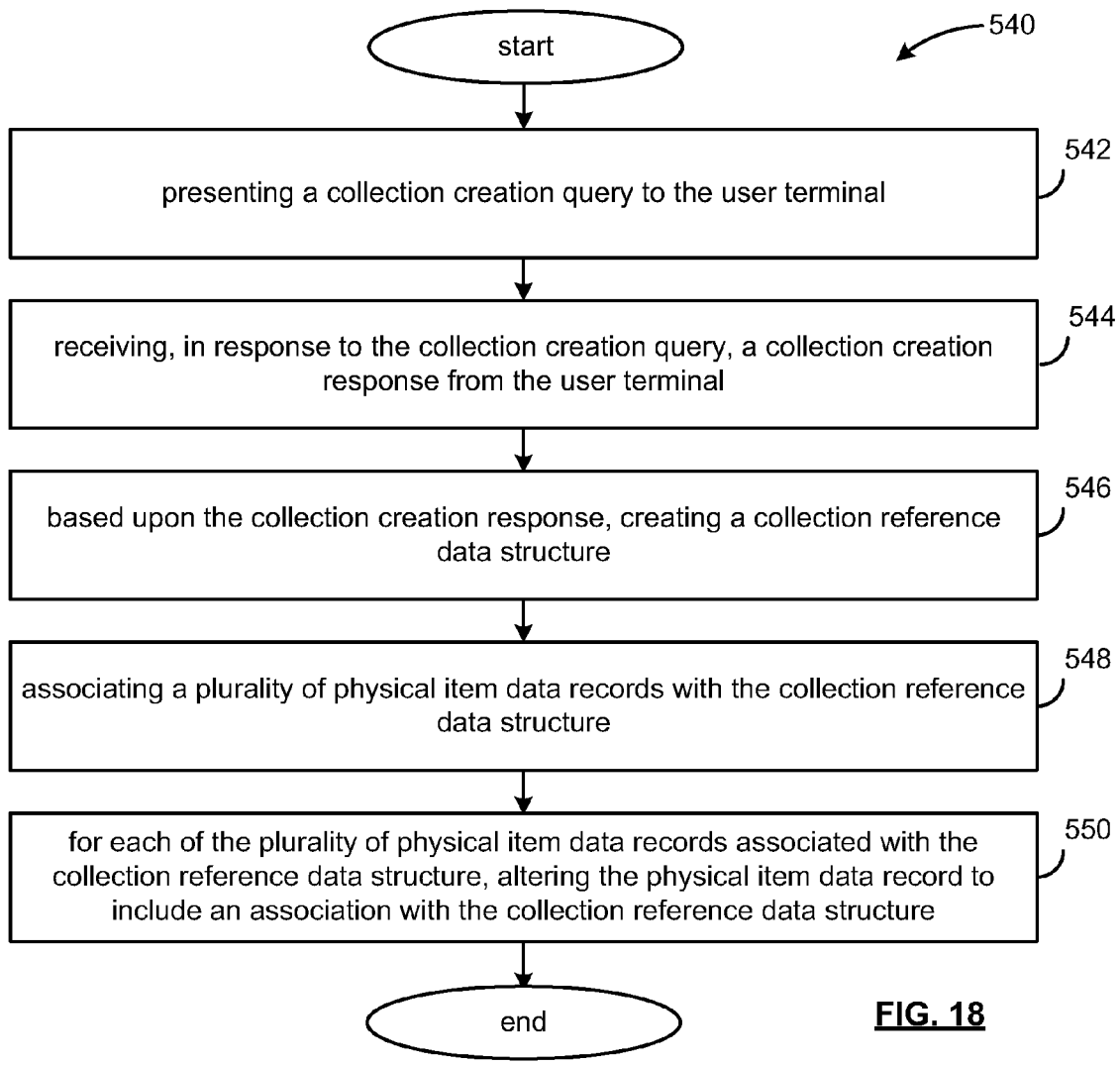
FIG. 18 is a flow diagram illustrating a method for further engaging in collection web page creation according to an embodiment of the invention.

FIG. 18 is a flow diagram illustrating a method 540 for further engaging in collection web page creation according to an embodiment of the invention.

At step 542, the item data management server presents a collection creation query to the user terminal, and receives at step 544, in response to the collection creation query, a collection creation response from the user terminal. Based upon the collection creation response, the item data management server at step 546 creates a collection reference data structure, and associates a plurality of physical item data records with the collection reference data structure at step 548. For each of the plurality of physical item data records associated with the collection reference data structure, altering the physical item data record to include an association with the collection reference data structure.

Figure 19:
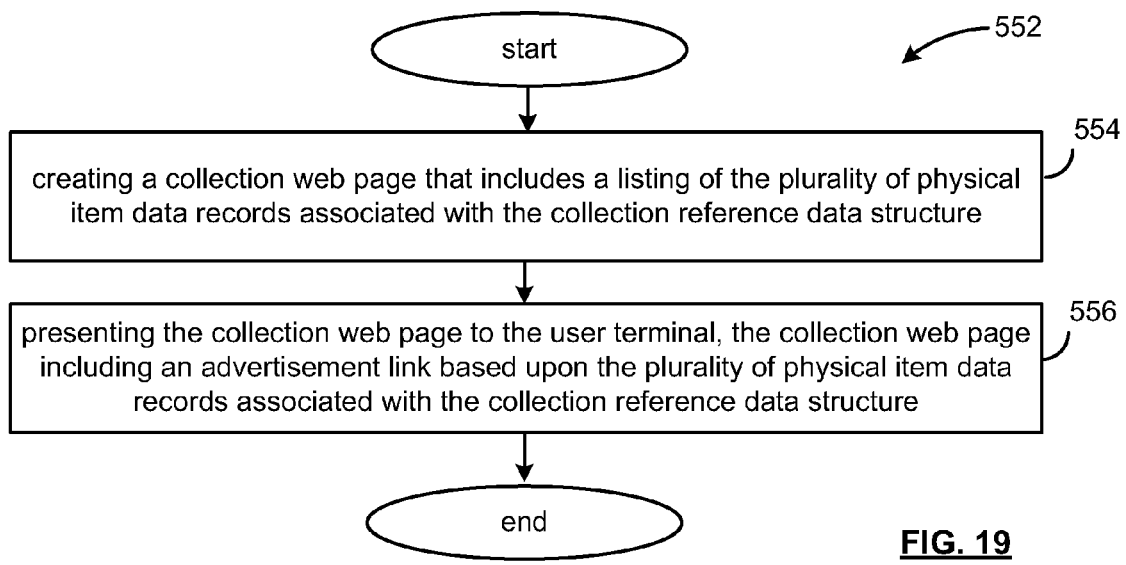
FIG. 19 is a flow diagram illustrating a method for further creating a collection web page according to an embodiment of the invention.

FIG. 19 is a flow diagram illustrating a method 552 for further creating a collection web page according to an embodiment of the invention.

At step 554, the item data management server creates a collection web page that includes a listing of the plurality of physical item data records associated with the collection reference data structure. The item data management server, at step 556, presents the collection web page to the user terminal, the collection web page including an advertisement link based upon the plurality of physical item data records associated with the collection reference data structure.

Figure 20:
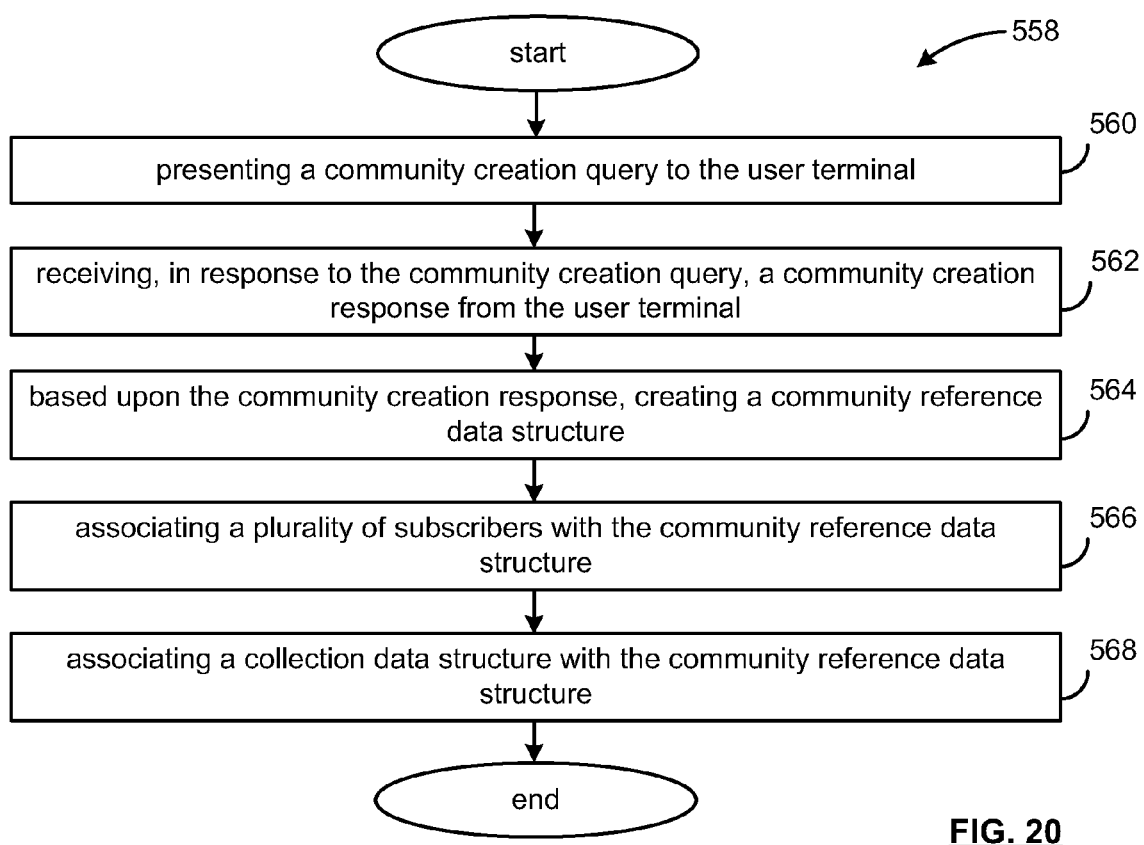
FIG. 20 is a flow diagram illustrating a method for further creating a community reference data structure according to an embodiment of the invention.

FIG. 20 is a flow diagram illustrating a method 558 for further creating a community reference data structure according to an embodiment of the invention.

At step 560, the item data management server presents a community creation query to the user terminal, and receives at step 562, in response to the community creation query, a community creation response from the user terminal. Based upon the community creation response, the item data management server at step 564 creates a community reference data structure. At steps 566 and 568, the item data management server associates a plurality of subscribers and a collection data structure with the community reference data structure.

Figure 21:
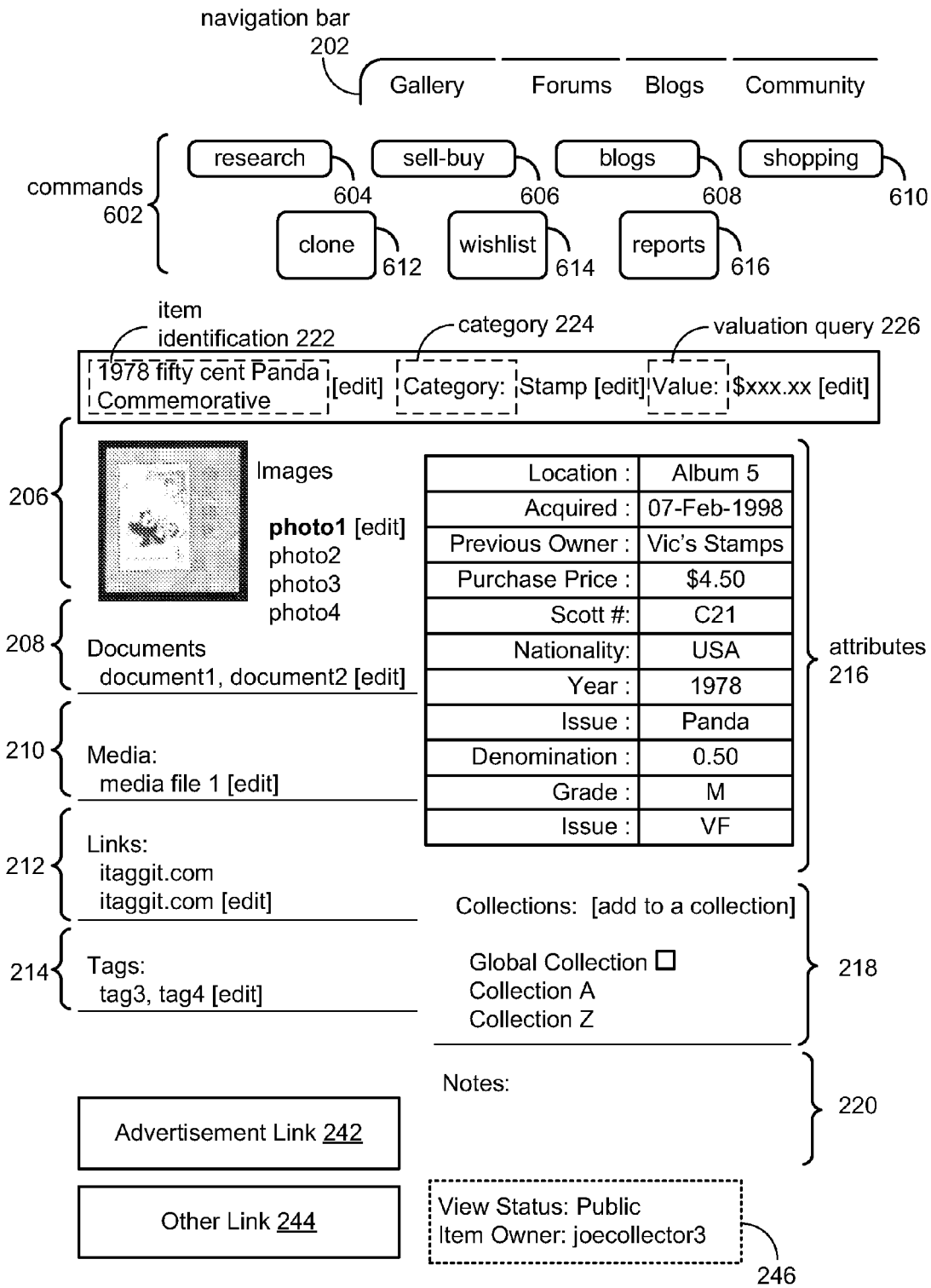
FIG. 21 illustrates a web page that includes commands presented to a user of the item data management server according to an embodiment of the invention.

FIG. 21 illustrates a web page 600 that includes commands 602 presented to a user of the item data management server 24. To the extent that the web page 600 recites elements and/or content similar to that of the web page 168 of FIG. 8, discussion or explanation of those elements and/or content will not be repeated.

The commands 602, with the example of the web page 600, relate to further action or activity for a physical item in the control of a user. The commands 602 may also relate or pertain to collections of physical items in the control of a user, as well as to collections based upon combinations physical items in the control of the user and to those in the control of other users to the item data management server 24.

The commands 602 include a research command 604, a sell-buy command 606, a blogs command 608, a shopping command 610, a clone command 612, a wishlist command 614, and a reports command 616.

The research command 604 issues a command to the item data management server 24 to provide a search query in which the search terms are based upon some or all of the attributes 216 elements of the physical item data record on which the web page 600 is based.

The sell-buy command 606 issues a command to the item data management server 24 to either sell the item displayed in the web page 600 that is in the physical control of the user, or to buy the item displayed in the web page 600 when it is in the physical control of another user of the item data management server 24.

The blogs command 608 issues a command to the item data management server 24 to enter a weblog associated with the user of the item data management server 24 to journal items of interest for general public consumption. As the command is issued from the web page 600, the initial option provided to the user of the item data management server 24 is to provide a weblog entry relating to the physical item presented by the web page 600.

The shopping command 610 issues a command to the item data management server 24 to present a shopping query to the user. The shopping query provides search terms that can be based upon some or all of the attributes 216 for the physical item in the control of the user. The shopping query accesses external sites, as well as physical item data records of the item data management server 24. Also, the shopping query provides for physical item-based products. The physical item-based products, including data tags, are discussed in detail with reference to FIGS. 22 through 29.

The clone command 612 issues a command to the item data management server 24 to clone the physical item data record for the physical item. The clone feature provides rapid entry of physical items into the database, based on basic elements of the source physical item data record, such as the physical item attributes 216 and images 206, and/or including associated discussions, blog entries, discussion threads, et cetera.

The wishlist command 614 issues a command to the item data management server 24 to place the item on a wishlist viewable by other users selected by the user (such as the user's friends, families, associates, et cetera). The wishlist provides gift giving suggestions or ideas, and further facilitates transfer of items between users to the item data management server 24.

The reports command 616 issues a command to the item data management server 24 to provide a printable report or version of the web page 600. The printable report further can be exported into other file formats such as a Comma-Separated Values (.CSV) format, word document (DOC), excel spreadsheet (XLS), Rich Text Format (RTF), et cetera, for use in spreadsheet and/or database applications.

Figure 22:
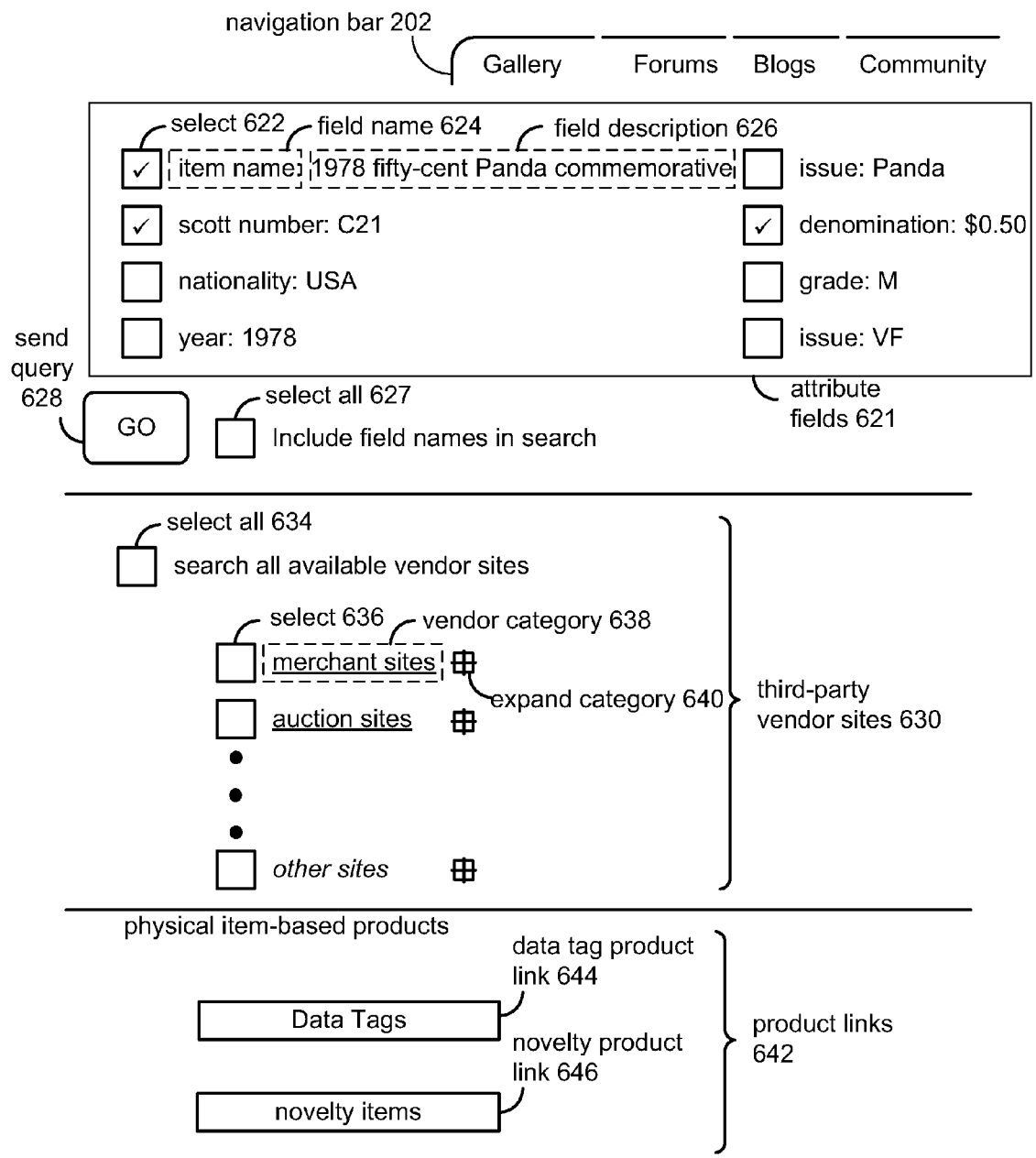
FIG. 22 illustrates a shopping query according to an embodiment of the invention.

FIG. 22 illustrates a shopping query 620 that the item data management server 24 presents to the user via the user terminal 76. The shopping query 620 is invoked when a user selects the shopping command 610 of the web page 600.

The shopping query 620 includes a navigation bar 202, attributes field 621, third-party vendor sites 630, and product links 642. The navigation bar 202 includes gallery, forums, blogs, and community commands for navigating to other functions within the web site supported by the item data management server 24. Generally, the navigation bar 202 provides a user with ready access to other features available by the item data management server 24, in which the item data management server 24 may also expand or limit the command options for a given web page or query presented to a user. Accordingly, the navigation bar 202 may provide additional commands such as search, collections, experts, and contacts, et cetera. The add new physical item query field 204 includes an item identification query 152, an item categorization query 156, and a valuation query 226. The navigation bar 202 is discussed in detail with reference to FIG. 5.

The attribute fields 621 include attributes relating to the physical item data record presented on the source web page 600. Each of the attributes in the attribute field includes a select 622, a field name 624, and a field description 626. In this example, the web page 600 presented the physical item data record for a 1978 fifty-cent Panda Commemorative stamp. The shopping query 620 allows some or all of the attribute fields to be selected for shopping search query. A select all option 627 allows all attribute fields to be selected without the need to manually select each attribute select 622 for each of the attribute field.

The third-party vendor sites 630 includes a plurality of selectable vendor categories 638, each of which being are selectable via the select 636. Further, all vendor sites are selectable via the "select all" 634. Each of the categories may be expanded to display the sites included under the category. For example, merchant sites may include amazon.com, barnesandnoble.com, et cetera. The auction sites may include ebay.com, dovebid.com, et cetera. Other various sites may be included, such as indicated by the "other sites" marker.

Upon selection of the attributes from the attribute fields 621, and the third-part vendor sites 630, the query is sent via send query 628. The item data management server 24 then provides to the user terminal a search result page for review and further options regarding purchases and/or shopping.

As another product selection option, the shopping query presents the product links 642. The product links 642 provide physical item-based products that include a data tag product link 644, and a novelty product link 646. The physical item-based products provide products based upon the physical item data record of a physical item in the control of the user. For example, the novelty product line 646, when selected, provides a query to the user offering coffee mugs with images of a physical item, promotional flyers of a physical item, brochures of physical item collections, et cetera. These items may be provided via a third-party vendor and/or client applications executed by the item data management server 24.

The data tag product link 644, when selected, provides a data tag creation query 660 query offering data tag formats, which is discussed in detail with reference to FIG. 23.

Figure 23:
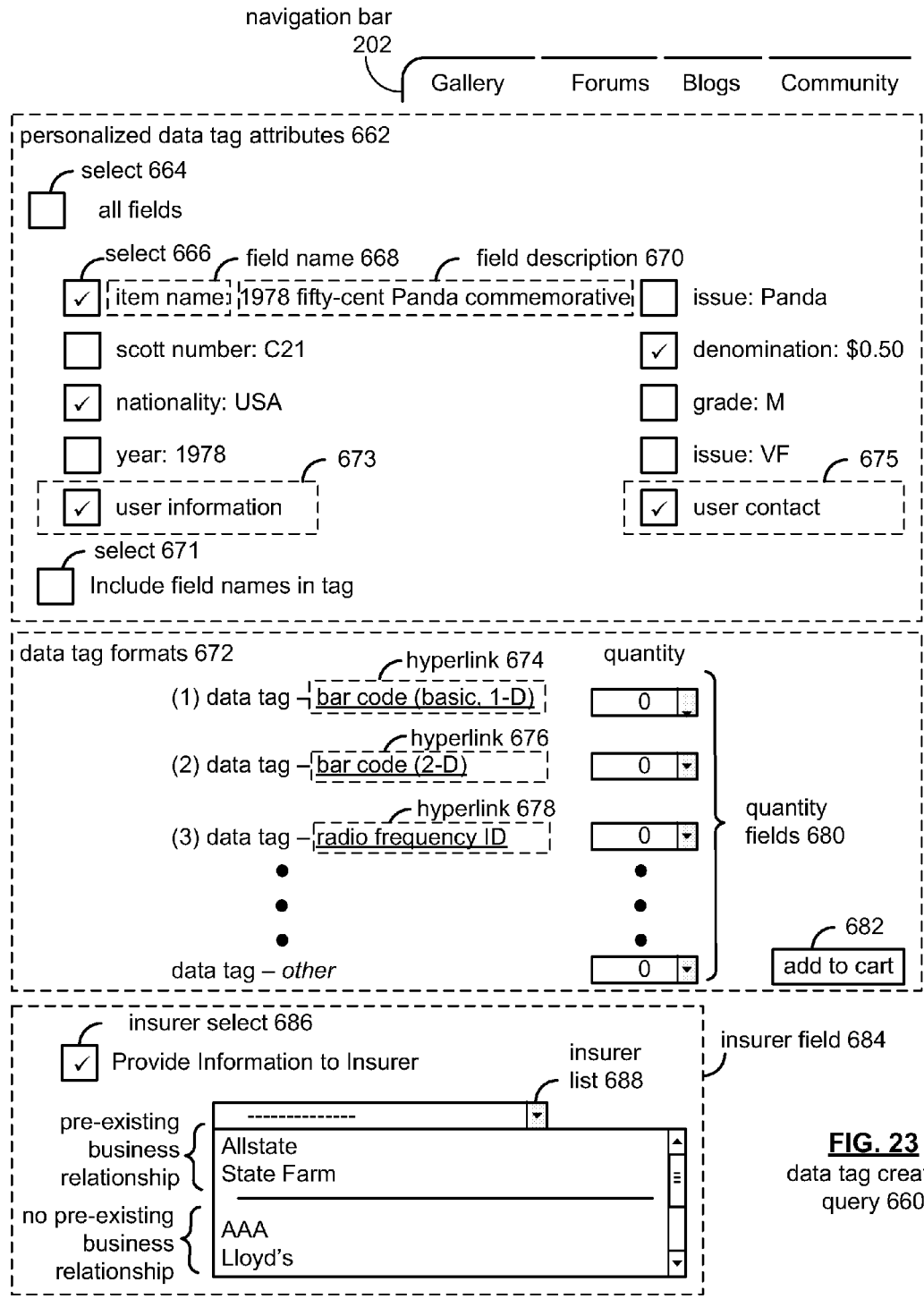
FIG. 23 illustrates a data tag creation query including personalized data tag attributes, data tag formats, and an insurer field according to an embodiment of the invention.

FIG. 23 illustrates a data tag creation query 660, which includes personalized data tag attributes 662, data tag formats 672, and an insurer field 684. The data tag creation query 660 operates to obtain information for data tag generation, in which the data tags may be affixed and/or otherwise associated with a physical item in the control of a user. The data tags reduce the burden of maintaining the inventory database, and simplify the tracking and identifying (either through title or attribute identification via the reader 17 (see FIG. 1) of physical items in the control of a user. Further, the creation of the data tags provide the user the opportunity to forward the associated physical item data record to a third party service provider (such as an insurer), serving to maintain a present status of the physical items.

The personalized data tag attributes 662 provide for the inclusion of attributes, from the physical item data record for the physical item, into the data tag generated via the item data management server 24. In this manner, the physical item can include digital information, in which commercially-available readers can convert into human readable form. In this manner, the reader can convey information regarding the physical item without access to the item data management server 24, as well as providing "key term" access to the physical item data record when coupled to the item data management server 24. All of the available personalized data tag attributes 662 for the physical item may be selected via the select 664. Further information may be included such as the field names (via select 671), the user information 673 and the user contact 675.

The user information 673 and the user contact 675 provide general information beyond basic key information, such as the identity of the user in the control of the physical item, and contact information such as address, phone number, e-mail address, et cetera. Though this information is not specific to the physical item, the information provides further information when the physical item temporarily out of the possession of the user—such as for display with a museum collection, a piece of art work displayed at a gallery, et cetera.

The attribute fields each include a select 666, a field name 668, and a field description 670. In this example of a 1978 fifty-cent Panda commemorative stamp, the selected attribute information to be included in the data tag is the item name, the nationality, the denomination, the user information and user contact. Though the resulting data tag may be larger than the stamp, the data tag may be affixed to a mounting board, display page, and/or mounting package for the stamp.

The amount of information that may be embedded in a data tag is limited by the underlying data tag technology. The data tag formats 672 set out the formats available for selection by a user. The data tag formats 672 include a bar code (basic 1-D), a bar code (2-D), a radio frequency ID, and other formats that are available or may become available for data tag creation for attachment to a physical item.

Each of the data tag formats has an associated hyperlink that provides additional information, including a format example, the available data size threshold for the format, et cetera. For example, the bar code (basic, 1D) format includes a hyperlink 674, which provides information relating to the format, which is discussed in detail with respect to FIG. 24. The bar code (2D) includes a hyperlink 676, which provides information relating to the format, which is discussed in detail with respect to FIG. 25. The radio frequency ID includes a hyperlink 678, which is discussed in detail with respect to FIG. 26.

When the selected attributes exceed the data size threshold for a selected format, the user is notified (such as via a pop-up window). The user is advised either to select fewer attributes before proceeding, or to select another data tag format having a larger data size threshold that can more readily accommodate the selected attributes.

The data tag format is selected via the quantity fields 680. As one of ordinary skill in the art may appreciate, other selection techniques may be used. With a selected quantity, the items are added to the users cart via the "add to cart" 682. The order can then be processed via available ecommerce techniques for various forms of payment and/or processing. That is, some data tag formats may be processed as part of a user status in the item data management server 24, and others, due to their sophistication, require third-party vendors to supply the product (for example, data tags implementing radio frequency ID technology).

The user may also provide the data tag information to an insurance server via the insurer field 684. The insurer field includes an option to provide information to an insurer via an insurer select 686. When selected, the pull-down menu of the insurer list 688 lists the available insurers (that are based upon the user input or as a default set of insurers). In addition to the insurer field 684, other value-added affiliate services may be provided through the item data management server 24 based upon the physical items in the control of a user. For example, other such services may include security and/or collateral loan services, investigation services for retrieval of physical items, auction services, et cetera.

The insurer list 688 includes insurance servers having a pre-existing business relationship with the item data management server 24, and insurance servers not having a pre-existing relationship with the item data management server 24. The item data management server 24 enters into a business relationship with an insurance server when a user adds the information to the physical item data record. In this manner, the user identifies insurers that provide insurance services for their physical items. With the addition of a data tag to the physical item, the physical item data record may be provided to the appropriate insurance servers via the insurer field 684. The addition of insurers, and insurance servers, to a physical item data record is discussed in detail with respect to FIG. 27.

Further, additional insurers are listed in the insurer list 688 in which the user has not identified as providing insurance services, and accordingly, do not have a pre-existing business relationship via the item data management server 24. Upon user request, these insurers can be provided an abridged list of the physical item (or items when a collection is provided to an insurer) via the physical item data records. The abridge list is then treated by the insurer as an invitation to submit an offer on insurance coverage. Accordingly, the user receives an insurance quote from the insurer.

Also, a user may have multiple policies with a single insurer or multiple insurers (for example, a home owner policy, an automobile policy, a personal articles floater policy, et cetera). In these instances, the insurer and the policy coverage may be provided with respect to those pre-existing business relationships.

Figure 24:
FIG. 24 illustrates a one-dimensional (1D) barcode format for a data tag according to an embodiment of the invention.

FIG. 24 illustrates a one-dimensional (1D) barcode 700 that includes a first data size threshold. Various 1D barcode formats are available for use, such as a "Code 39" format, "Code 128" format, et cetera. The 1D barcode 700 is a data tag format selectable from the data tag creation query 660. The 1D barcode 700 is made up of a single row of bars, which is called "one-dimensional" because the data is encoded in the horizontal width. Increasing the data size threshold is only achievable by increasing the barcode width. Beyond a certain point the barcode becomes too wide, and unwieldy, to scan.

Generally, a 1D barcode format is useful for only a few characters (of up to about fifteen characters). In this regard, the 1D barcode format includes basic information such as the key 242 (that includes a unique identifier based on a creator and an item identification (item ID)) of a physical item data record 240 (see FIG. 7). Other forms of identifiers may be used, such as serial numbers or other unique identifiers derived from the key 242. Because 1D barcodes are low capacity applications (such as key numbers), only a limited amount of personalized data tag attributes 662 may be included with the resulting 1D barcode data tag.

Figure 25:
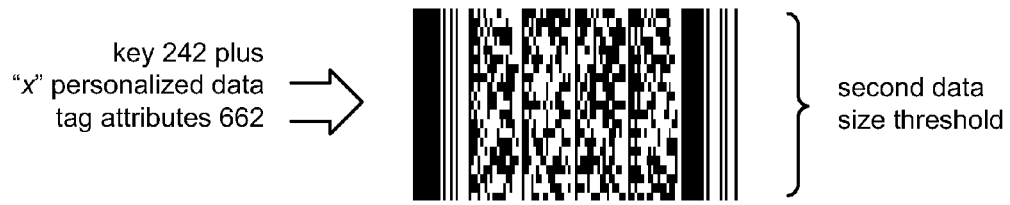
FIG. 25 illustrates a two-dimensional (2D) barcode format for a data tag according to an embodiment of the invention.

FIG. 25 illustrates a two-dimensional (2D) barcode 702 that includes a second data size threshold, which is greater than the first data size threshold of the 1D barcode 700. Various 2D barcode formats are available for use, such as a PDF417 format. The 2D barcode 702 is a data tag format selectable from the data tag creation query 660. The 2D barcode 702 encodes data in both the horizontal and vertical dimensions. As more data is encoded, the size of the barcode can be increased in both the horizontal and vertical directions while also maintaining a manageable shape for scanning.

Generally, a 2D barcode format is generally useful for between 10 to 20 characters, although additional information can be added upwards of 249 characters—the limitation being the amount of space available on a physical item for attachment of the data tag. In this regard, a greater number of personalized data tag attributes 662 may be included in a 2D barcode format, limited by the size of the data tag desired by the user. Accordingly, the 2D barcode format can accommodate a key 242 plus "x" number of personalized data tag attributes 662 (where the key 242 includes a unique identifier based on a creator and an item identification (item ID)) of a physical item data record 240 (see FIG. 7). Other forms of identifiers may be used, such as serial numbers or other unique identifiers derived from the key 242.

Figure 26:
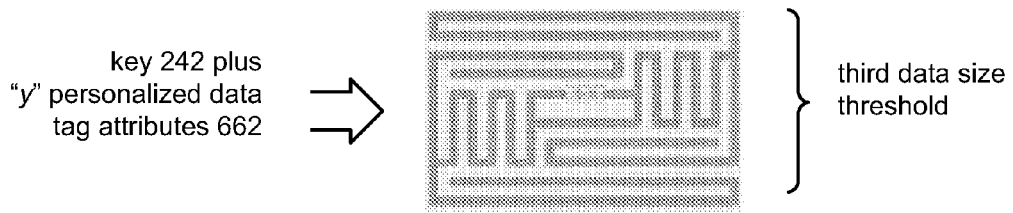
FIG. 26 illustrates a radio frequency identification (RFID) format for a data tag according to an embodiment of the invention.

FIG. 26 illustrates a radio frequency identification (RFID) data tag 704 that includes a third data size threshold, which is greater than the second data size threshold of the 2D barcode 700. Several standards are available regarding RFID data tags regarding coding of data, middleware protocols, air interfaces, et cetera. Examples of the standards include ISO 14443 (for contactless systems), ISO 15693 (for vicinity systems), et cetera. An RFID tag contains a transponder that emits messages readable by RFID readers. The RFID tag stores a key 242, and with writable memory, can also store information for transfer to various RFID readers in different locations. The information stored can be key 242 plus "y" personalized data tag attributes 622, where y is greater than x. In this regard, a greater amount of data may be stored with the RFID data tag 704, in addition to its use of other RFID features such as item tracking, physical item data record retrieval from the item data management server 24, et cetera.

The RFID data tag 704 may be provided as a passive device and an active device. In general, active RFID data tags include a power source, which increases the size and expense of the RFID data tag. A passive RFID data tag obtains power from the signal of an external reader, and accordingly, can be very small in contrast to an active RFID data tag. Passive RFID data tags can provide about two-kilobits of memory, which conveniently can store the key 242 and the personalized data tag attributes 662. The amount of memory is expected to increase for a passive RFID data tag, and accordingly, additional information may be stored on the RFID tag (for example, a physical item's warranty information, chain-of-title, appraisal information, et cetera).

Further, an RFID data tag provides the ability for tags to be read without line-of-sight access, the read range of the RFID data tag is greater than that of a barcode reader. RFID tag technology also permits readers to simultaneously communicate with multiple RFID tags, allowing the reader to capture the contents of multiple physical items in the control the user. The resulting benefit is the ability to easily the presence (or absence) of the physical items.

Figure 27:
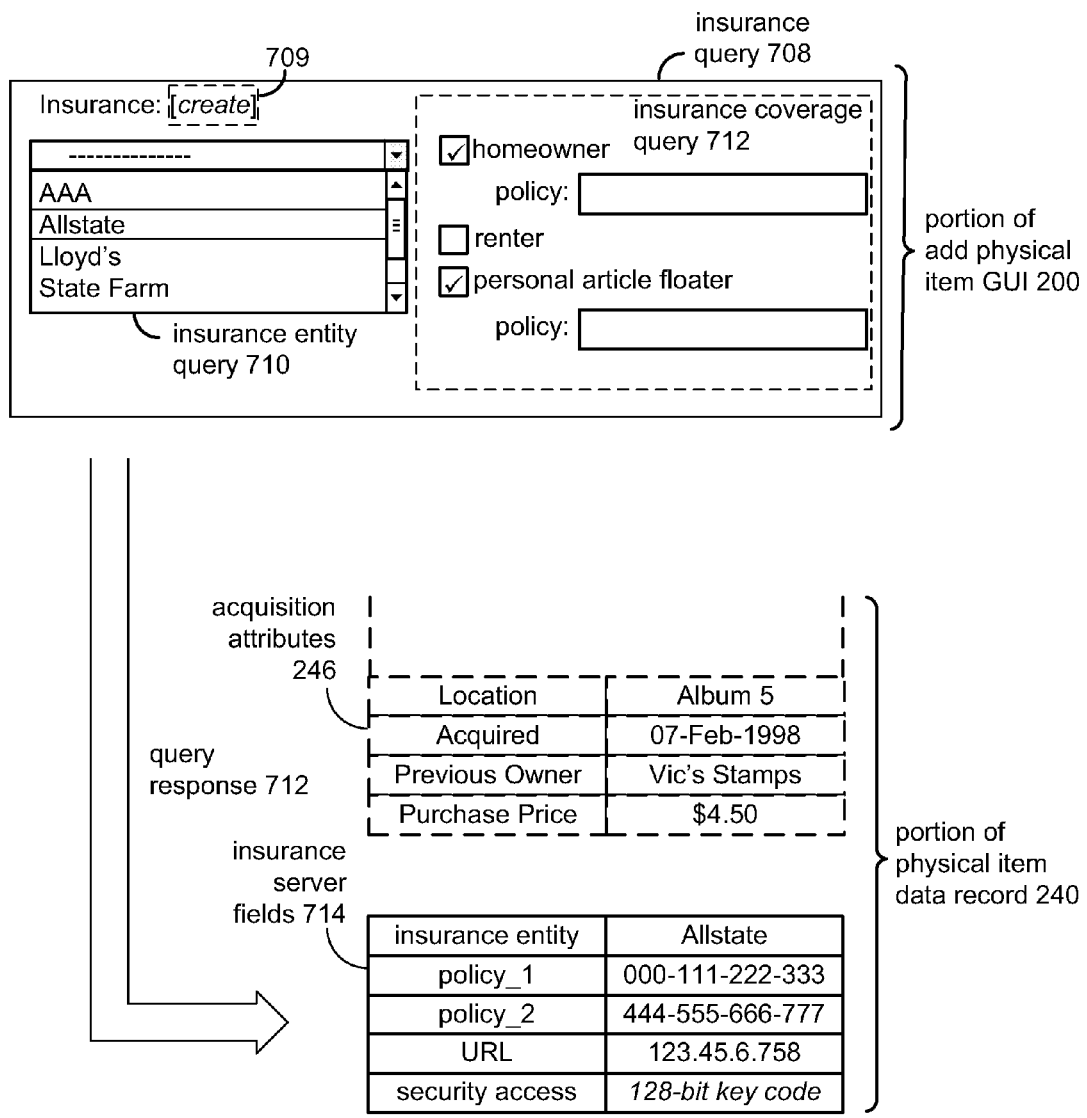
FIG. 27 illustrates an interaction between a portion of an add physical item GUI that includes insurance query and a portion of a physical item data record that includes insurance server fields according to an embodiment of the invention.

FIG. 27 illustrates a portion of the add physical item GUI 200 that includes insurance query 708, and a portion of the physical item data record 240 that includes insurance server fields 714. The response to the query 712 populates the physical item data record 240 with the data input by the user, in addition to the other fields of the remaining portion of the physical item data record 240, accordingly.

The insurance query 708 may be invoked by pressing the "create" command icon 709. Pressing the "create" command icon 709 produces the insurance entity query 710, and the insurance coverage query 712. The insurance entity query 710 includes names of insurance providers. When the list of insurance providers lacks one desired by the user, the user has the capability of manually adding the insurer to the list. The insurance coverage query 712 sets out the various forms of insurance that may be available through that insurer. When a form of insurance is selected, a query is presented to the user for the associated policy number.

Upon pressing the ADD command 227 (see FIG. 5), the user terminal 76 sends a query response 712 to the item data management server 24, which updates the insurance server fields 714 of the physical item data record 240 for the physical item in the control of the user. The item data management server 24 further populates the insurer server fields with the URL information and security access information associated with the insurance server. In this manner, a business relationship is established with the insurance server. In the present example, the business relationship is established with "Allstate." Accordingly, when the user creates data tags for attachment to the physical items, the insurer field 684 of the data tag creation query 660 can provide a list of insurers having pre-existing business relationships with the item data management server 24.

Figure 28:
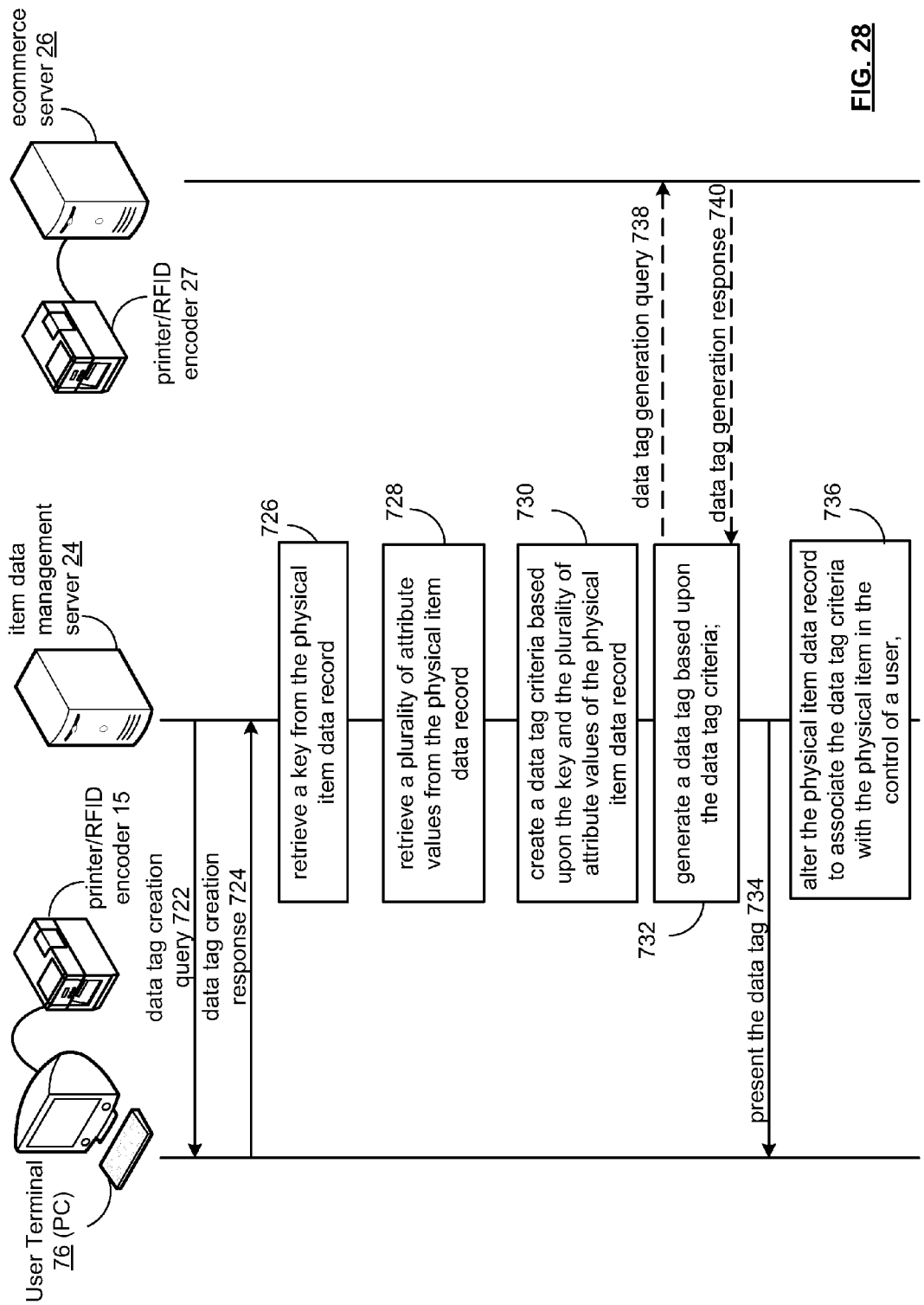
FIG. 28 illustrates a signal flow relating to data tag generation for a plurality of physical items in the control of a user according to an embodiment of the invention.

FIG. 28 illustrates a signal flow relating to data tag generation for a plurality of physical items in the control of a user between a user terminal 76, a item data management server 24, and an ecommerce server 26.

The item data management server 24 presents a data tag creation query 722 to the user terminal 76. The item data management server 24 receives, in response to the data tag creation query 722, a data tag creation response 724 that corresponds to and identifies a physical item data record 240 of a physical item of the plurality of physical items in the control of the user. The data tag creation response 724 includes a data tag format selected from a plurality of data tag formats (such as a 1D barcode 700, a 2D barcode 702, a RFID data tag 704, et cetera), where each of the data tag formats have a data size threshold.

At 726, the item data management server 24 retrieves a key 242 from the physical item data record 240. The key 242 includes a creator and an item identification (item ID) value. At 728, the item data management server 24 retrieves a plurality of attribute values from the physical item data record 240. The attribute values are those selected by the user among the personalized data tag attributes 662. The cumulative data size of the key 242 with the plurality of attributes values is less than the data size threshold of the selected data tag format. In the event that the user selects more attributes than can be accommodated by the selected tag format, the item data management server 24 will notify the user that the threshold has been exceeded, and to remove some of the attributes from the personalized data tag attributes 662 so as to fall below the given data size threshold.

The item data management server 24, at 730, creates a data tag criteria based upon the key and the plurality of attribute values of the physical item data record 240. In this regard, the item data management server 24 may generate a serial number or other unique identifier based on the key to the physical item data record 240, in addition to placing the information from the selected attributes in a format according to an applicable data tag standards specification (such as for 1D barcode format, 2D barcode format, and/or RFID format). The information is conveyed from the user at 724 via the data tag creation response.

The item data management server 24 then generates, at 732, a data tag based upon the data tag criteria. The item data management server 24 may generate the data tag locally or externally. That is, the devices and software applications may reside with the item data management server 24. Following the creation of the data tag, the item data management server 24 presents the data tag 734 to the user terminal 76 over the network. The user may then print the data tag with a printer device coupled to the user terminal 76, and attach the data tag to the physical item.

In the alternative, the item data management server 24 may generate the data tag externally via the ecommerce server 26. For example, external generation may be more practical when the selected data tag technology is relatively new, such as with RFID technologies. That is, the equipment to generate the data tags is highly specialized and may be prohibitively expensive, making it more expedient and practical to outsource the data tags to an external third-party source, such as an ecommerce server 26 having the necessary infrastructure to efficiently provide the data tags. In this instance, the item data management server 24 composes a data tag generation query based upon the data tag criteria, and issues the data tag generation query 738 to the ecommerce server 26.

The item data management server 24 receives a response to the data tag generation query from the server, the response indicating the generation of the data tag, which the item data management server 24 presents the data tag 734 to the user terminal 76. When an external source produces the data tag, the presentation includes an order status and a delivery status of the data tag.

At 736, the item data management server 24 alters the physical item data record 240 to associate the data tag criteria with the physical item in the control of a user. Subsequently, the physical item data record 240 for the physical item can be retrieved from the plurality of physical item data records of the user in response to receiving an input based upon the data tag, such as from a reader 17 (see FIG. 1).

Figure 29A:
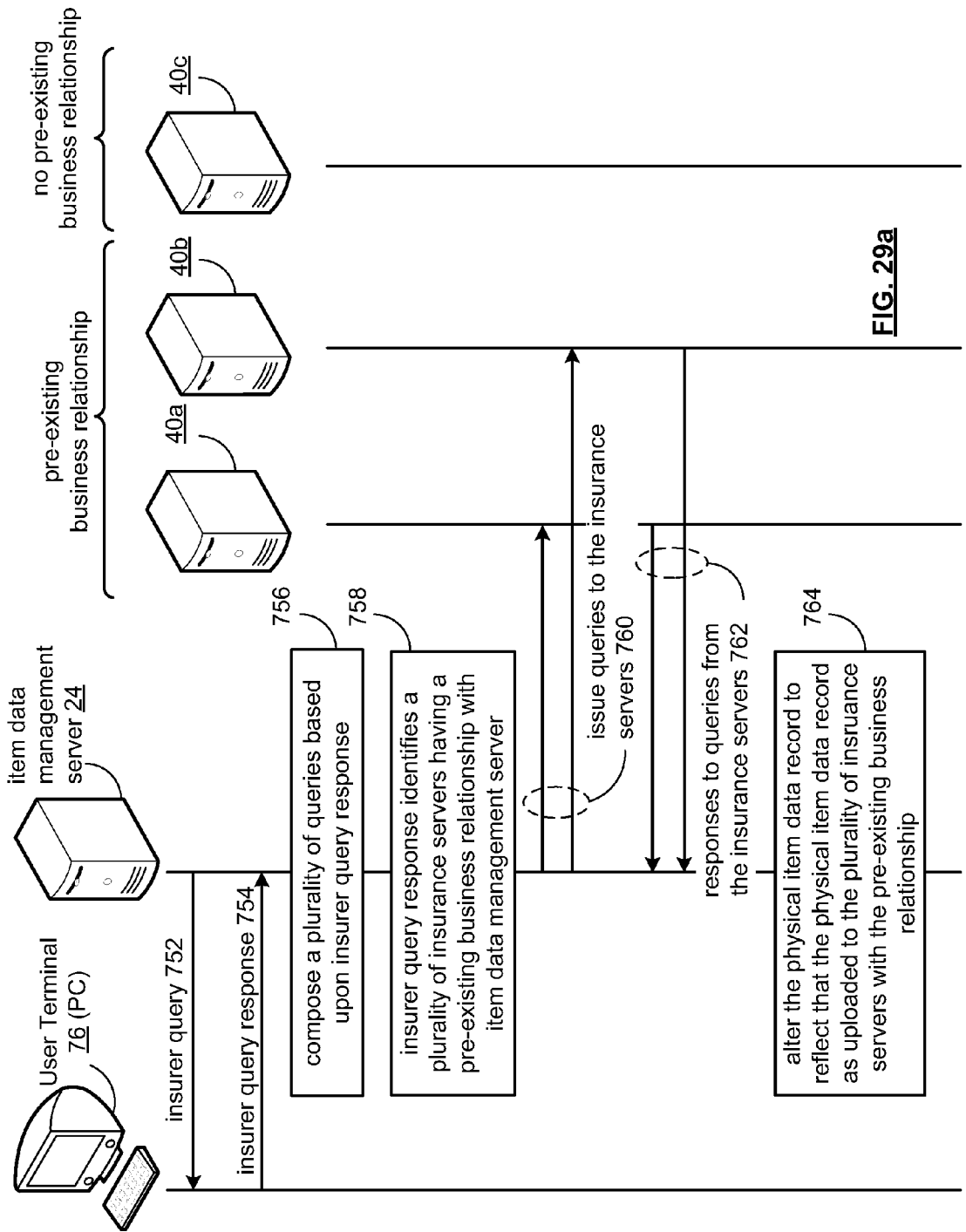
FIGS. 29a and 29b illustrate a signal flow relating to providing information based upon data tag generation to insurance servers according to an embodiment of the invention.
Figure 29B:
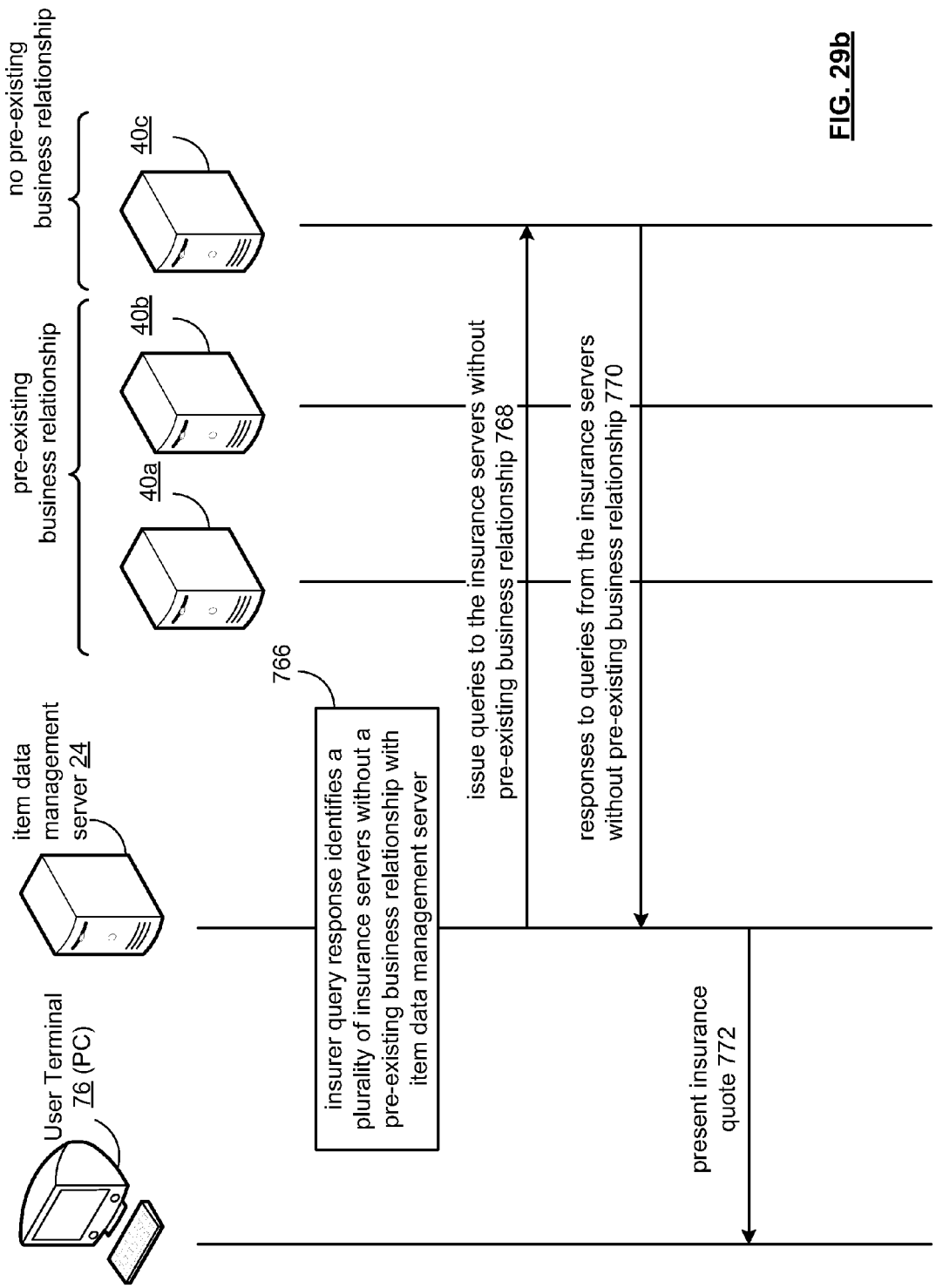

FIGS. 29a and 29b illustrate a signal flow relating to providing information based upon data tag generation between a user terminal 76, an item data management server 24, and insurance servers 40a, 40b, and 40c.

The item data management server 24 presents an insurer query 752 to the user terminal 76. At 756, the item data management server 24 composes, in response to the insurer query 752, a plurality of queries based upon the insurer query response 754. At 758, when the insurer query response identifies a plurality of insurance servers (40a and 40b) having a pre-existing business relationship with the item data management server 24, issuing the plurality of queries to the insurance servers at 760. The item data management server 24 receives a plurality of responses to the plurality of queries from the plurality of insurance servers at 760, wherein each response includes information relating to uploading the physical item data record to each of the insurance servers 40a and 40b.

The item data management server 24, at 764, alters the physical item data record to reflect that the physical item data record as uploaded to the insurance servers 40a and 40b. In this manner, recent inventory information is available to third-party insurers, facilitating up-to-date records regarding the physical items in the control of a user, and further facilitating insurance claims if the need should arise.

In FIG. 29b, when, at 766, the insurer query response identifies an insurance server 40c without a pre-existing business relationship with the item data management server 24, the item data management server 24, at 768, issues the queries to the insurance server 40c. The item data management server 24 receives a response to the query of 768 from the insurance server without the pre-existing business relationship with the item data management server 24. Because there is no pre-existing relationship, the query response includes an insurance quote relating to the physical item associated with the physical item data record 240. At 772, the item data management server 24 presents the insurance quote to the user terminal 76.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

What is claimed is:

1. A method for data tag generation for a plurality of physical items in the control of a user based upon a plurality of physical item data records of an item data management server that correspond to a plurality of physical items in the control of a user, the item data management server communicatively coupled to a user terminal and a plurality of servers via at least one data network, the method comprising:
   presenting a data tag creation query to the user terminal;
   receiving, in response to the data tag creation query, a data tag creation response that includes a data tag format selected from a plurality of data tag formats, each of the data tag formats having a data size threshold;
   retrieving a key from the physical item data record, wherein the key includes a creator identifier and an item identification;
   retrieving a plurality of attribute values from the physical item data record;
   creating a data tag criteria based upon the key and the plurality of attribute values of the physical item data record;
   generating a data tag based upon the key and the plurality of attribute values of the physical item data record; and
   presenting the data tag identifying the physical item.

2. The method of claim 1 further comprises:
   presenting an insurer query to the user terminal;
   composing, in response to the insurer query, a plurality of queries based upon the insurer query response;
   when the insurer query response identifies a plurality of insurance servers having a pre-existing business relationship with the item data management server, issuing the plurality of queries to the plurality of insurance servers;
   receiving a plurality of responses to the plurality of queries from the plurality of insurance servers, wherein each response includes information relating to uploading the physical item data record to each of the insurance servers; and
   altering the physical item data record to reflect that the physical item data record as uploaded to the plurality of insurance servers.

3. The method of claim 2 wherein:
   when the insurer query response identifies an insurance server without a pre-existing business relationship with the item data management server, issuing the plurality of queries to the insurance server without the pre-existing business relationship;
   receiving a response to the query from the insurance server without the pre-existing business relationship with the item data management server, wherein the query response includes an insurance quote relating to the physical item associated with the physical item data record; and
   presenting the insurance quote to the user terminal.

4. The method of claim 1 wherein generating a data tag comprises:
   composing a data tag generation query based upon the data tag criteria;
   issuing the data tag generation query to a server; and
   receiving a response to the data tag generation query from the server, the response indicating the generation of the data tag.

5. The method of claim 1 wherein generating a data tag comprises:
   composing a data tag generation query based upon the data tag criteria; and
   issuing the data tag generation query to the user terminal.

6. The method of claim 1 wherein the selected data tag format comprises at least one of a one-dimension (1D) bar code, a two-dimension (2D) bar code, and a radio frequency ID (RFID).

7. An item data management server to generate and associate data tags with a plurality of physical items in the control of a user based upon a plurality of physical item data records corresponding to the plurality of physical items in the control of a user, the item data management server communicatively coupled to a user terminal and a plurality of servers via at least one data network, the item data management server comprises:
   processing circuitry;
   a network interface operably coupled to the processing circuitry that supports data transmission with the at least one data network;
   a user interface operably coupled to the processing circuitry; and
   memory operably coupled to the processing circuitry, wherein the memory stores operational instructions that cause the processing circuitry to:
   present a data tag creation query to the user terminal,
   receive, in response to the data tag creation query, a data tag creation response that includes a data tag format selected from a plurality of data tag formats, each of the data tag formats having a data size threshold;
   retrieve a key from the physical item data record, wherein the key includes a creator identifier and an item identification;
   retrieve a plurality of attribute values from the physical item data record;
   create a data tag criteria based upon the key and the plurality of attribute values of the physical item data record;
   generate a data tag based upon the key and the plurality of attribute values of the physical item data record; and;
   present the data tag identifying the physical item.

8. The item data management server of claim 7 the memory further stores operational instructions that cause the processing circuitry to:
- present an insurer query to the user terminal;
- compose, in response to the insurer query, a plurality of queries based upon the insurer query response;
- when the insurer query response identifies a plurality of insurance servers having a pre-existing business relationship with the item data management server, issue the plurality of queries to the plurality of insurance servers;
- receive a plurality of responses to the plurality of queries from the plurality of insurance servers, wherein each response includes information relating to uploading the physical item data record to each of the insurance servers; and
- alter the physical item data record to reflect that the physical item data record as uploaded to the plurality of insurance servers.

9. The item data management server of claim 8 wherein the memory further stores operational instructions that cause the processing circuitry to:
- when the insurer query response identifies an insurance server without a pre-existing business relationship with the item data management server, issue the plurality of queries to the insurance server without the pre-existing business relationship;
- receive a response to the query from the insurance servers without the pre-existing business relationship with the item data management server, wherein the query response includes an insurance quote relating to the physical item associated with the physical item data record; and
- present the insurance quote to the user terminal.

10. The item data management server of claim 7 wherein the memory stores operational instructions that cause the processing circuitry to generate a data tag by:
- composing a data tag generation query based upon the data tag criteria;
- issuing the data tag generation query to a server; and
- receiving a response to the data tag generation query from the server, the response indicating the generation of the data tag.

11. The item data management server of claim 7 wherein the memory stores operational instructions that cause the processing circuitry to generate a data tag by:
- composing a data tag generation query based upon the data tag criteria; and
- issuing the data tag generation query to the user terminal.

12. The item data management server of claim 7 wherein the selected data tag format comprises at least one of a one-dimension (1D) bar code, a two-dimension (2D) bar code, and a radio frequency ID (RFID).

\* \* \* \* \*